US006315346B1

United States Patent
Martin

(10) Patent No.: US 6,315,346 B1
(45) Date of Patent: Nov. 13, 2001

(54) LOAD AND LOCK TAILGATE

(76) Inventor: Herbert Martin, 1441 HC Mathis Dr., Paducah, KY (US) 42001

( * ) Notice: Subject to any disclaimer, the term of this patent is extended or adjusted under 35 U.S.C. 154(b) by 0 days.

(21) Appl. No.: 09/317,726

(22) Filed: May 24, 1999

(51) Int. Cl.$^7$ ..................................................... B60P 7/14
(52) U.S. Cl. .............................. 296/57.1; 410/32; 410/34; 410/35; 410/38; 410/121; 410/143; 296/50
(58) Field of Search ................................. 410/32, 34, 35, 410/38, 121, 151, 150, 143, 129, 144, 130; 224/403, 42.38; 248/500; 296/50, 57.1

(56) References Cited

U.S. PATENT DOCUMENTS

| 710,639 | * | 10/1902 | Vickers | 410/38 |
|---|---|---|---|---|
| 2,764,105 | * | 9/1956 | Stiegel | 410/121 |
| 2,855,217 | * | 10/1958 | Baswell | 410/32 |
| 4,121,849 | * | 10/1978 | Christopher | 410/38 |
| 4,650,383 | * | 3/1987 | Hoff | 410/150 X |
| 4,770,579 | * | 9/1988 | Akramit | 410/150 |
| 5,118,156 | * | 6/1992 | Richard | 410/143 X |
| 5,553,981 | | 9/1996 | Braden . | |
| 5,584,521 | | 12/1996 | Hathaway et al. . | |
| 5,586,850 | * | 12/1996 | Johnson | 410/129 X |
| 5,636,883 | | 6/1997 | Johns . | |
| 5,673,956 | | 10/1997 | Emery . | |
| 5,738,471 | | 4/1998 | Zentner . | |
| 5,827,023 | | 10/1998 | Stull . | |
| 5,971,685 | * | 10/1999 | Owens | 410/151 |
| 6,068,433 | * | 5/2000 | Baloga | 410/121 X |

* cited by examiner

Primary Examiner—Stephen T. Gordon

(57) ABSTRACT

A tailgate movable in horizontal and vertical directions and being operative to (1) lock down loads that are too long to be accommodated within the standard length of the bed of a pickup truck or any other vehicle having a cargo bed with sidewalls, or (2) lock down confined moveable loads that are liable to slide or shift within the truck bed. A motorized chain drive produces the forward and backward horizontal movement of the tailgate thereby securing the total cargo and preventing shifting and sliding of the loads within the truck bed. The drive also produces the vertical movement of the tailgate which, together with the plurality of spring-loaded legs and spread pressure pads, provides a pressure locking system thereby holding down long, uneven cargo loads which are eccentrically loaded relative to the length of the truck bed and preventing torsion or slippage of said loads within the truck bed. A U-shaped component replaces the conventional tailgate connection to the truck bed and the moveable tailgate assembly is attached to this U-shaped component by manual or automatic locking devices. The entire tailgate assembly is hinged and can be opened in the conventional manner.

9 Claims, 24 Drawing Sheets

LOAD AND LOCK TAILGATE

BACKGROUND OF THE INVENTION

Recent models of pickup trucks have added shorter options of the standard truck bed lengths and are now offering eight-foot models and six-foot models thereby dictating that the longest totally enclosed load that can be carried must be restricted to within either of these standard lengths. In the shorter model, even with the tailgate lowered, the truck bed length only extends to seven feet, six inches. Problems arise while carrying loads with the tailgate lowered because the probabilities of cargo sliding out of the back are increased thereby requiring the transporter to devise some means of tying down the load. When loads approaching fifteen feet are carried, the center of gravity for these loads is shifted farther toward the back thereby making the load increasingly unstable and making it easier for the loads to shift towards the back and fly off of the truck. When loads exceed fifteen feet in length such as in long lengths of lumber, they are impossible to load without providing some sort of counterbalancing ballast, such as a couple of concrete blocks or a sack of sand, that is resting on the load and is positioned toward the front of the truck bed.

Additionally, there is a problem which has always existed with pickup trucks, that is, unstable cargo loads that are totally within the truck bed which are liable to roll or shift while being transported. The driver must devise some means of using ropes for tying these loads to prevent such movement. When carrying loads such as groceries that are apt to shift around in the truck bed, the driver is likely to see a cantaloupe or a bottle of juice rolling around the truck bed during acceleration or braking. Cargo that rolls, such as a lawnmower, must be tied down to prevent rolling either from front to back or from side to side.

In order to solve the above-mentioned problems, the applicant has designed and proposed a device which will utilize the weight of the truck to provide counterbalancing for the long load and which will provide a vertical locking mechanism to prevent the moving, shifting, and torque movement of the long load while it is being transported. The same, above-mentioned device may be adjusted horizontally along the truck bed to secure the moveable load against the truck cab and prevent any other said additional movement.

While there have been several other attempts at addressing these particular problems with devices being manufactured for pickup trucks that provide for securing cargo to the truck bed (U.S. Pat. No. 5,827,023; U.S. Pat. No. 5,584,521; and U.S. Pat. No. 5,673,956 for examples) all simply provide for additional securing attachments for ropes to be used in tying down the loads. None address the issue of an installed device that will permit the driver to easily and handily secure loads with the flexibility and consistency of a built-in system. Most of the other devices are restricted to securing loads at predetermined attachment points while this present invention permits the flexibility of an infinite variety of rigid position holdings without having to always carry along counterbalance or securing devices.

An alternative design is disclosed in co-pending application Ser. No. 09/310,211 filed at the U.S. Patent Office on May 12, 1999, to a similar retrofit model which can be installed on the truck sidewalls and will not require that the truck be drilled welded or otherwise damaged. This current invention is more specific to a factory installed configuration, and this present invention permits the tailgate to function in the normal manner, thereby permitting cargo to be loaded in the conventional manner. Additionally, this invention provides the bonus of a partial energy saving flow-through feature similar to the "ProNet" or "Air Gate" flow through tailgates, both of which are listed as patent pending. However, this current invention is in no way similar to either of these inventions in that they are simply mesh installed in place of an existing tailgate, and in this present invention the flow through feature is dictated by the utilitarian function of the load locking requirement of the tailgate.

It is therefore the object of this invention to utilize the tailgate as an improved compartmentalized cargo restrainer.

It is the object of this invention to utilize the tailgate as a clamping and locking device for holding down long loads.

It is the object of this invention to provide for ease of utilization by being a motor-driven device.

BRIEF SUMMARY OF THE INVENTION

It is the object of the present invention to solve the above-mentioned problems in the background statement and thus to provide a mechanical pressure system that can function as a locking device which will prevent the unwanted movement of cargo loads in a pickup truck during transport.

In order to accomplish the above-mentioned ends, the invention comprises:

A drive train that consists of an electrically driven motor, located at the cab side end panel of the truck, that is wired into the electrical system of the truck. The motor control consists of a waterproof push-button device which controls the forward-backward, up-down movements of the tailgate assembly. The motor control may be located within the truck cab, but more likely it will be better situated near the top of the sidewall at a position close to the truck cab. The entire drive train is a system of rods, friction cone or bevel gears, chains, sprockets, spur gears and rack gears. The upper side and rear rails of the truck bed serve as the concealing location for the components of the drive train. The materials are designed to be lightweight and thereby not add appreciably to the overall weight of the truck. Also, the fact that most of the solid bulk of the tailgate has been replaced by the flow through fingers compensates to offset any additional weight gain.

Two sets of mirror image rods (four rods), one side with left hand rotation and the other side with right hand rotation when considered from a position within the motor, lead from the electric motor with one rod connecting to a sprocket wheel and the other connecting to a bevel gear. (Essentially, this is simply two rods continuous through the motor with fixed spur gears at the center of each rod to receive the movement from the motor.) The sprocket wheels at each end of one said rod changes the direction of the power flow as it connects with a chain drive which is situated perpendicular to the sprocket rod. A keyseat shaft attached to a bevel gear forms a countershaft and likewise converts the direction of power from the other bevel gears on each end of the other said rod. The chain drive operates with another sprocket wheel designed into the rear post of the truck bed and the two loose ends of the chain are attached to the moveable carriage. The keyseat shaft passes through a hole drilled in the moveable carriage and is connected to the rear post by a ring bearing to permit the rotational movement of the keyseat shaft.

An H-shaped track runs parallel to the chain drive and the key seat shaft and a multiplicity of rollers attach to the said carriage and support said carriage permitting its horizontal movement along the said track as it is propelled by said chain drive. A semi-cored recess in the carriage housing accommodates the spur gear which is supported by the said keyseat shaft the same of which passes through a drilled hole in the carriage housing. Two vertical cylindrical slots are situated in the carriage housing on either side of the spur gear recess and are designed to provide a track recess for the vertical movement of the gear rack.

The said gear rack working in conjunction with the spur gear which is being turned by the keyseat shaft provides the vertical, up and down, movement of the tailgate assembly. The said gear rack has two tracks which slot into the said track recesses of the said carriage and this locks the two independent units together while still permitting the required movement. The gears of the rack do not extend the entire length of the unit thereby creating a governor to prevent the disassembling of the two units which would be caused by over travel. The gear rack unit also contains a slot thereby permitting the locking component of the locking handle to access the hollow core of the said gear rack unit and permit the locking of the gear rack with hollow top rail of the tailgate assembly.

The said hollow top rail contains a conventional scissors action tailgate-opening device, the locking bar of which attaches to an L-shaped unit that allows the tailgate to be locked in the conventional closed (tailgate up) position or released so that it can be swung down to the open (tailgate down) position. The additional function of said L-shaped unit is to work with the locking handle and release the moveable section of the tailgate assembly. The said locking handle extends through a slotted opening in the hollow top rail and can be rotated axially 180 degrees according as to whether it is in the locking mode for dropping the tailgate or if it is in the locking mode for permitting the horizontal and vertical movements of the moveable tailgate section. The said locking handle is composed of two inter-nesting parts with spring-loaded snaps for holding it in place according to which locking function is desired.

The said locking handle contains a split rod which, when the handle is turned down and pushed in, inserts into the lower hole in the L-shaped piece. Additionally the said locking handle has three, in-line, parallel projections which serve locking functions. The locking handle is permanently affixed within the slotted opening of the hollow top rail, and when the said locking handle is turned down, the projections lock the said hollow top rail to the U-shaped piece. When the locking handle is turned up, the projections lock the said hollow top rail to the said gear rack. The said slot in the said gear rack permits this locking function to take place, while at the same time permitting the tailgate to be disengaged from the gear rack when it is necessary to drop the tailgate. The spring-loaded bearings hold the locking handle in position until it necessary to change functions. When the said locking handle is turned down and the spring-loaded, outer-nested section is pushed in, this engages the conventional tailgate unlocking mechanism and allows the entire tailgate section to be dropped.

The said hollow top rail contains a plurality of permanently attached, equally spaced, spring-loaded fingers which serve the function applying pressure to rigid, long cargo loads of unequal and varying heights within the limits of the movements of the fingers. The fingers may be divided into a multiplicity of interlocking sections, alternately solid and hollow, with each hollow section containing a pressure spring which is designed to resist a predetermined load limit. The total height variance permitted to accommodate the cargo load is equivalent to approximately one-half the total length of said finger. The base of each said finger contains a spread, seat pad designed for holding down the loads, and each said pad is typically designed to fit within the spacing and depth format of the conventional corrugated bed of a typical pickup truck, although this is not necessarily a requisite.

The said U-shaped piece functions as the hinged connection to the rear end posts of the truck sidewalls and is the unit that functions as the conventional tailgate, permitting the tailgate to be dropped. The said U-shaped piece has a multiplicity of slots and is slotted to a depth, width and shape to accommodate the shape of the said spread seat pads located at the base of the said spring-loaded fingers, and because the slots do not pass completely through the base of the said U-shaped piece, when they are fitted into place, they provide the rigidity to the entire tailgate assembly to permit it to be opened in the conventional manner. The lower outside edges of the said U-shaped piece are hinged and attached to the end posts in the conventional manner of a regular truck tailgate.

BRIEF DESCRIPTION OF THE DRAWINGS

The present invention will be understood more fully from the detailed description given below and from the accompanying drawings of the preferred embodiment of the present invention, which, however, should not be taken to be a limiting factor to the invention but are for explanation and understanding only. Each component of the preferred embodiment is numbered separately, and the numbering of that component will remain consistent throughout the presentation.

The drawings.

DETAILED DESCRIPTION OF THE INVENTION

The following is a discussion of the preferred embodiments of the invention that references the accompanying drawings and, at this time, is considered to be the best mode for implementing the invention. In the description, numbered specific details are set forth in order to provide a thorough understanding of the invention, however, some minute variations may of necessity not be specifically covered, and, in other instances, well known structures may not be described in order to avoid unnecessary duplicity. The description is nonetheless intended to cover all aspects of the invention and any variations that might be subsequently claimed. Since the workings of the invention are completely symmetrical, mirror images of one another, the detailed description of the preferred embodiment will describe only one side with the understanding that the detailed workings will be replicated on the mirror image side.

Figure 1:
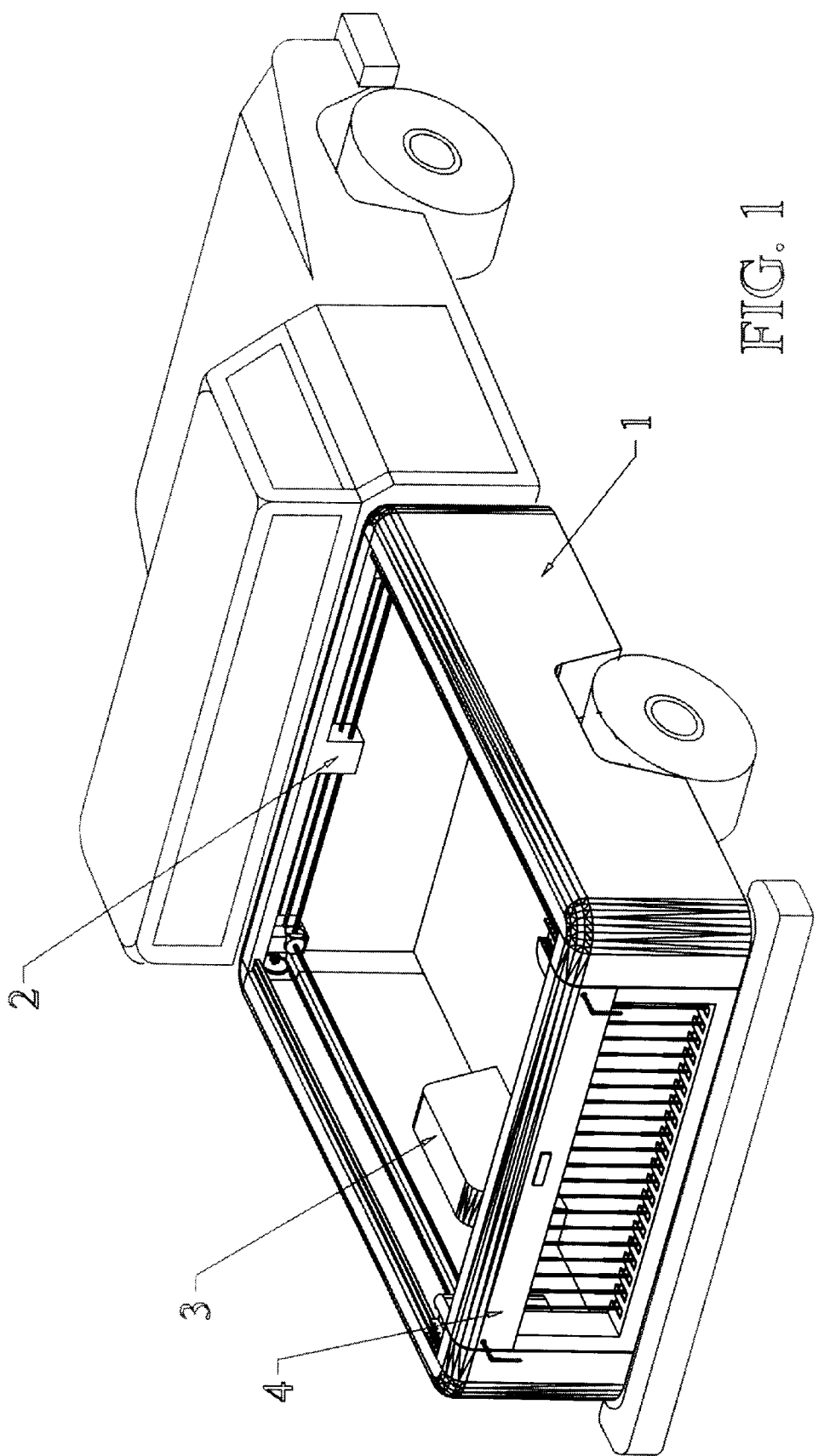
FIG. 1 is a standard pictorial representation of the complete preferred embodiment as it would appear as a factory installation.
Figure 2:
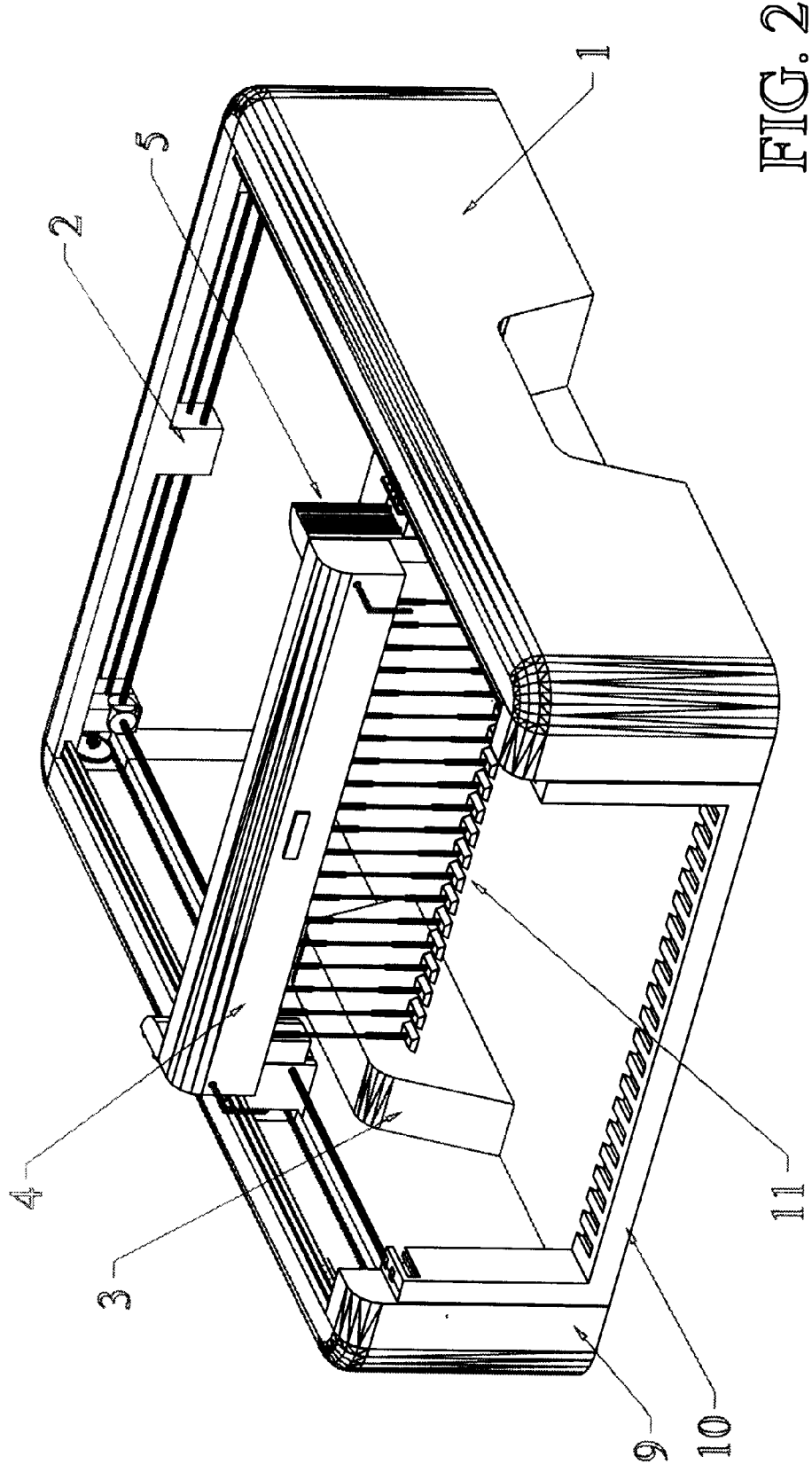
FIG. 2 is a standard pictorial representation of the complete preferred embodiment with the limited tailgate assembly shifted along its axes.
Figure 14:
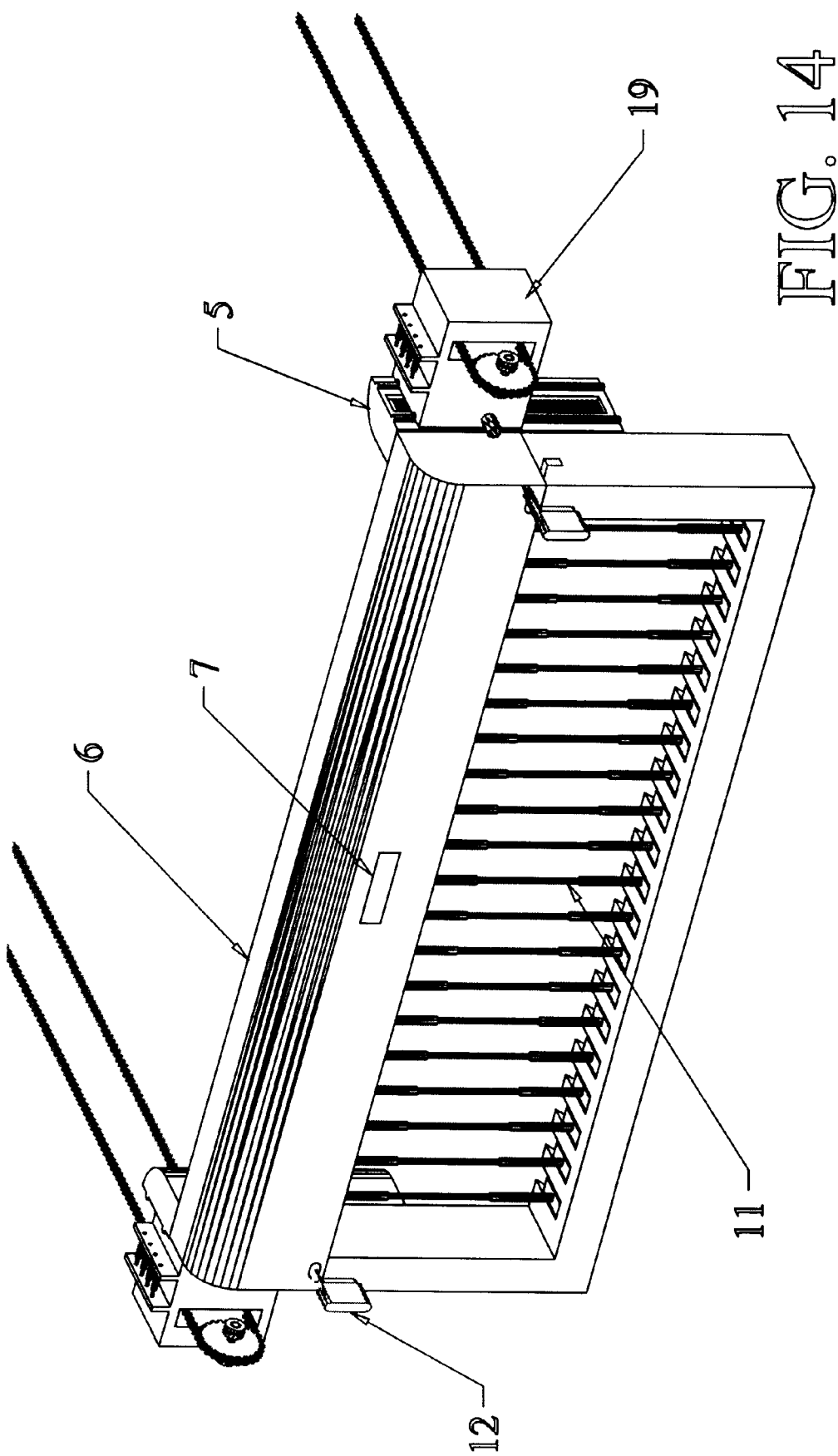
FIG. 14 is a standard pictorial of the moveable tailgate assembly.

FIGS. 1, 2, 3, and 4 illustrate an assembled unit embodying the present invention as it would appear as a factory installation on a truck bed. The assembly comprises a body with two side panels 1 having respective wheel wells 3 and a forward end panel for holding a motor 2. A drive assembly 13–16, 19 & 20 is mounted to the side and forward panels. A rear tail gate 4, opened with a latch 7, is mounted for horizontal movement forward of its conventional rearward position by the drive train assembly and for rotation about a horizontal axis from a vertical position to a horizontal orientation when in the rearward position. As shown in FIGS. 1, 2, & 14 this invention is one that allows the normal tailgate of a pickup truck to become a moveable locking device for cargo loads that are situated within the standard truck bed or that extend beyond the normal tailgate of the pickup truck. The moveable tailgate is designed to pass through the distance between the wheel wells, or it can be raised to pass over the said distance. The horizontal forward and backward movement of the moveable tailgate travels along a drive system that is located under the top rim of the sidewalls of the pickup.

Figure 3:
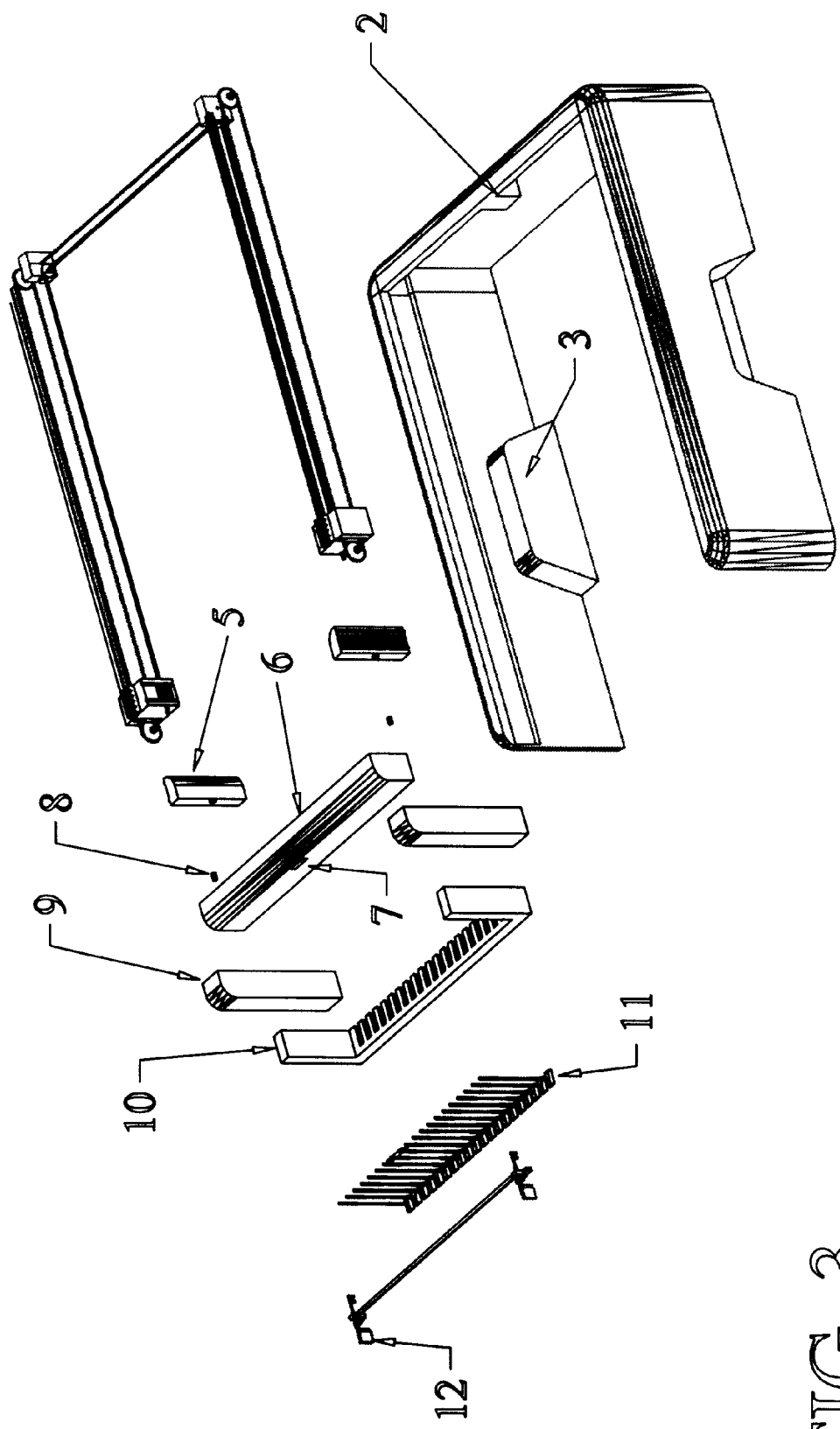
FIG. 3 is an exploded pictorial representation of the preferred embodiment.
Figure 6:
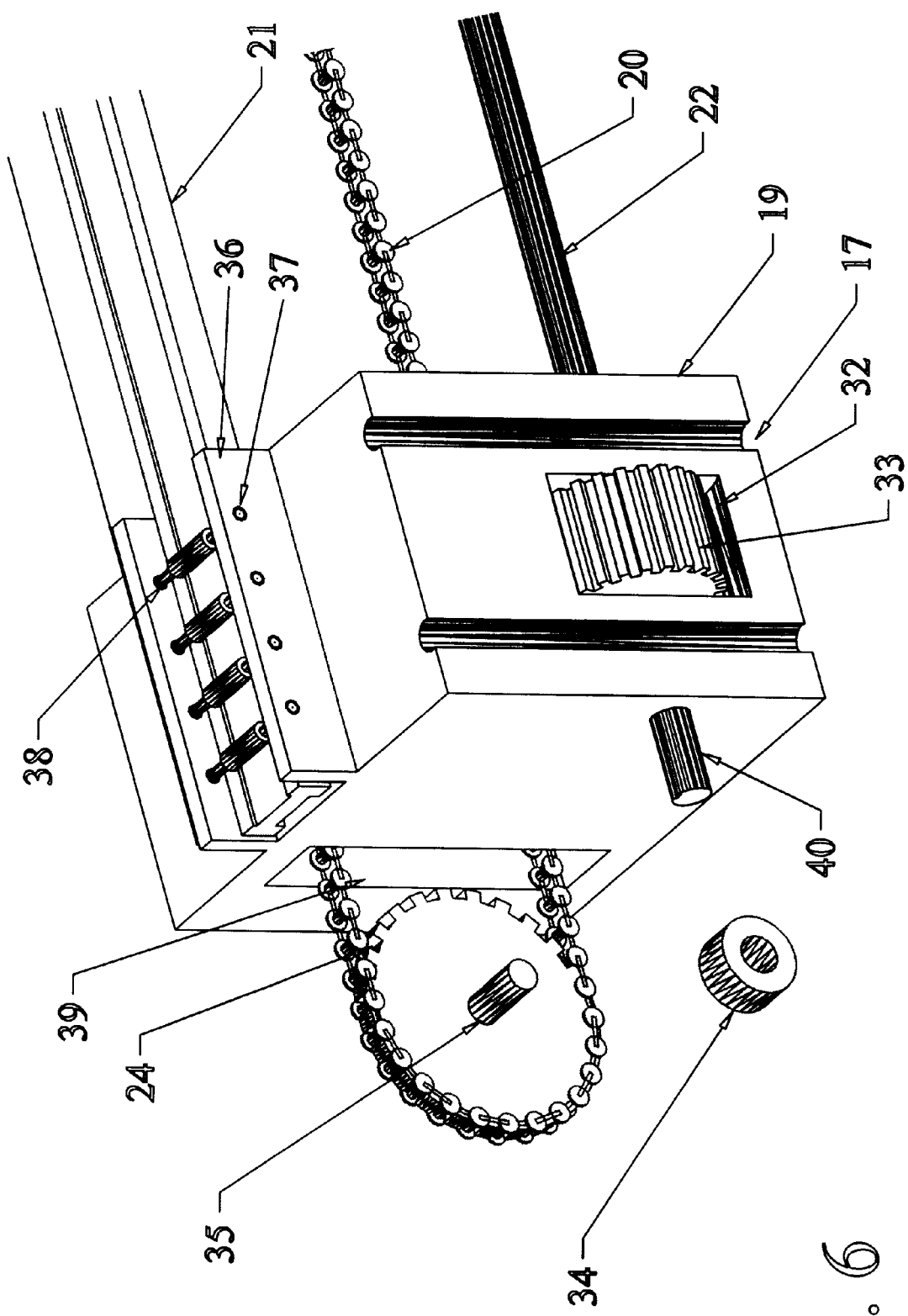
FIG. 6 is an enlarged pictorial representation of the carriage and chain drive system showing the spur gear.
Figure 7:
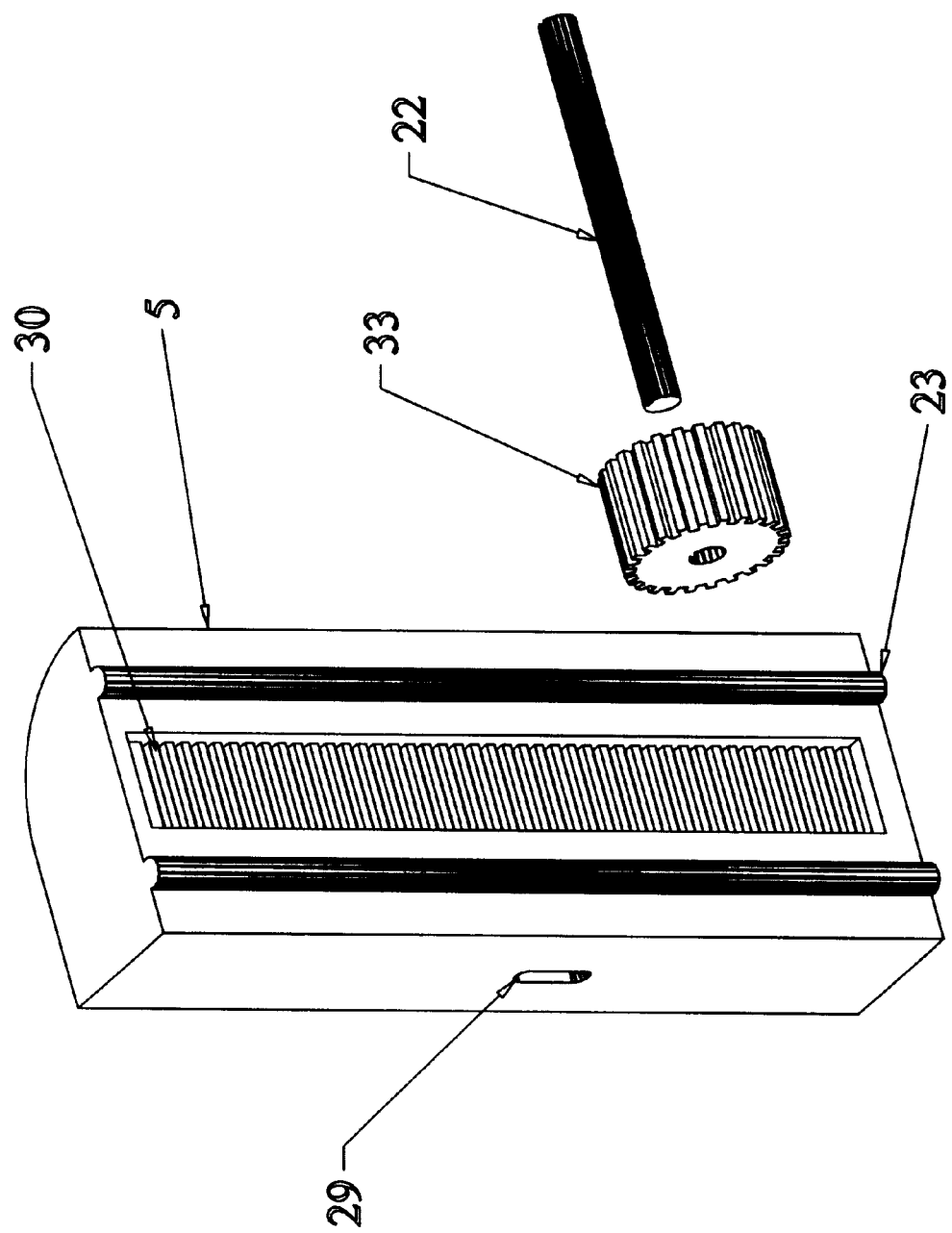
FIG. 7 is an enlarged, exploded pictorial representation of the spur gear and gear rack.
Figure 8:
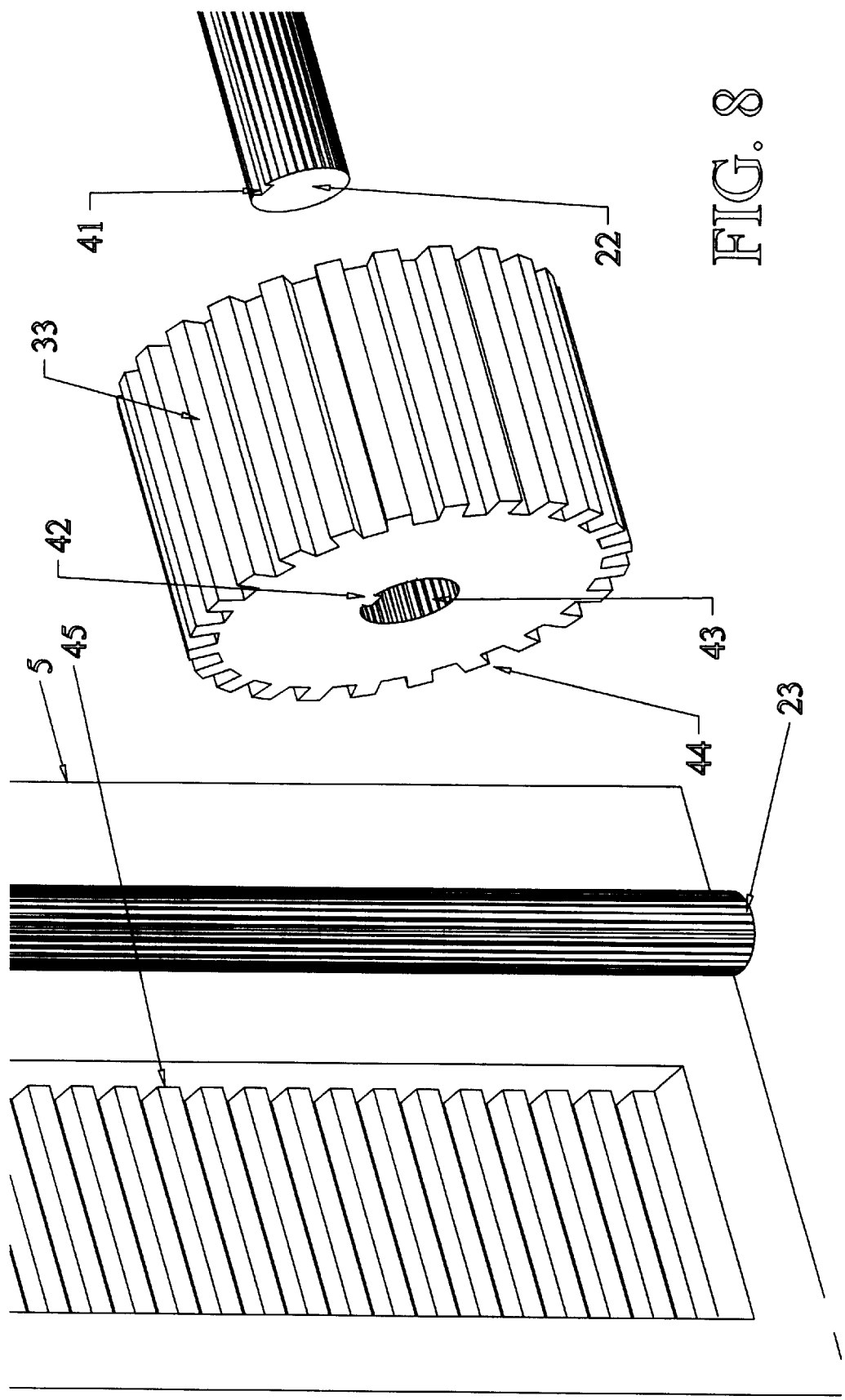
FIG. 8 is an enlarged, exploded pictorial representation of the spur gear and gear rack showing the keyseat and key.
Figure 9:
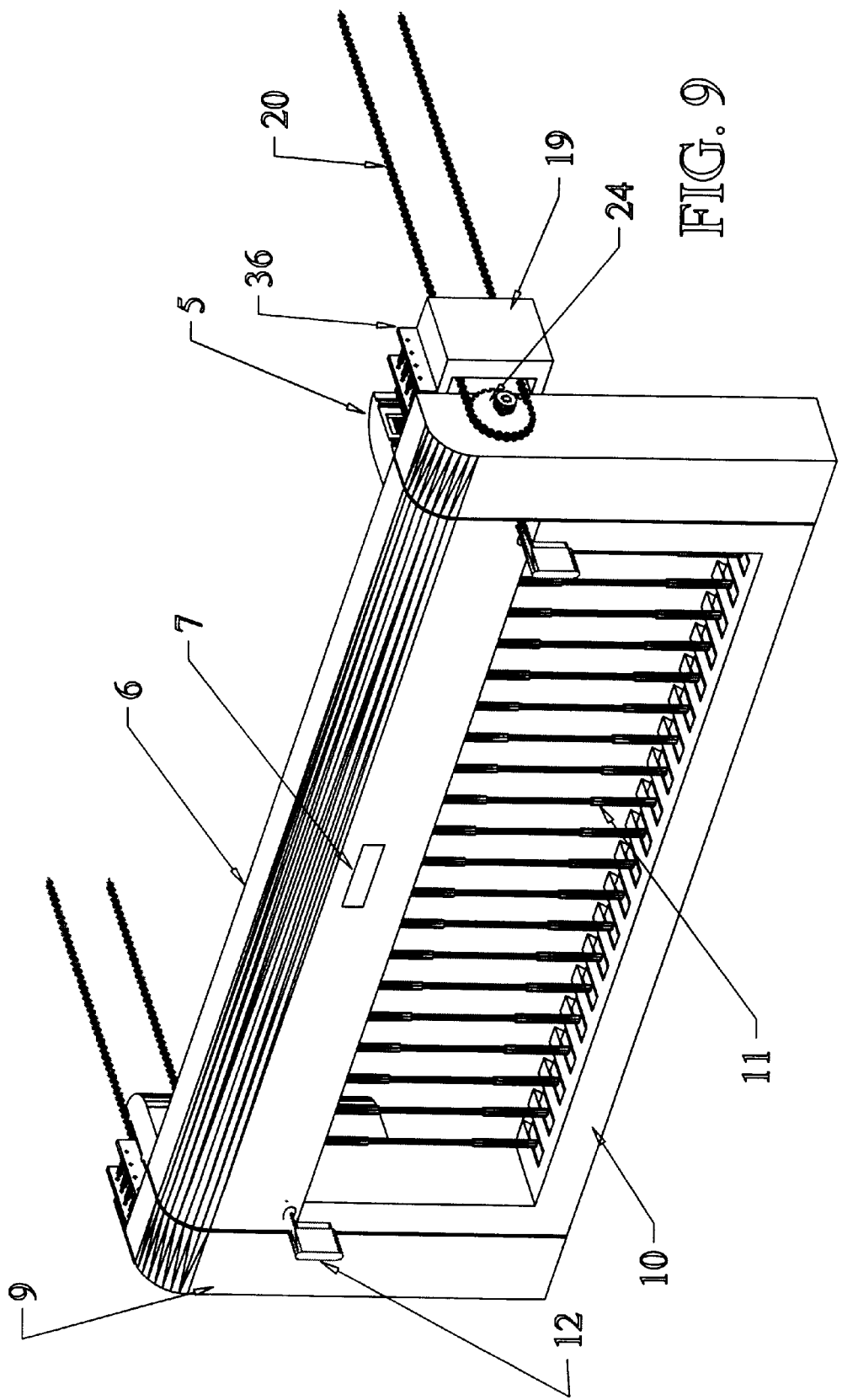
FIG. 9 is a standard pictorial of the moveable tailgate assembly.
Figure 11:
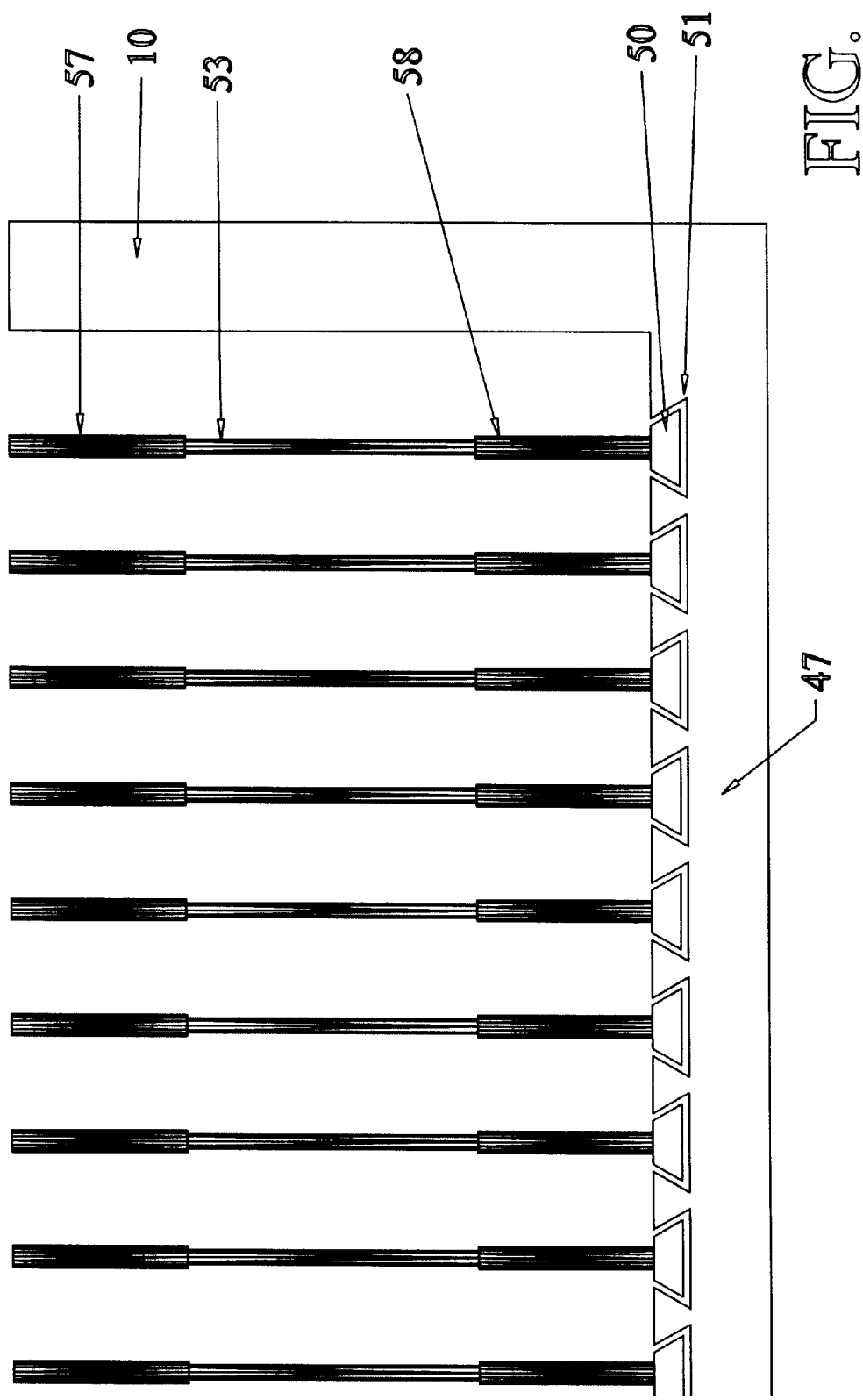
FIG. 11 is a standard front view of the U-Shaped component and the multiplicity of legs as assembled.

The exploded view of the basic components of the load and lock tailgate unit is illustrated in FIG. 3 and shows the manner in which the tailgate is constructed, on the basis of a hollow top rail 6 that is joined to a U-shaped piece 10, having two upright legs and horizontal piece 47 in FIG. 11, the latter having slots 51 for receiving spring loaded fingers 11. The tailgate is supported by a pair of rear posts 9, each disposed on opposite sides of the tailgate and is kept in a locked position by a locking handle assembly 12, subsequently explained in greater detail. The hollow top rail 6 is adjustable in a vertical direction by virtue of a gear rack 5, as illustrated in FIGS. 7, 8, and 9, that has a vertical arrangement 30 of teeth 45 for engaging the teeth 44 of a spur gear 33, mounted on the carriage 19, as illustrated in FIGS. 6 and 8.

Figure 4:
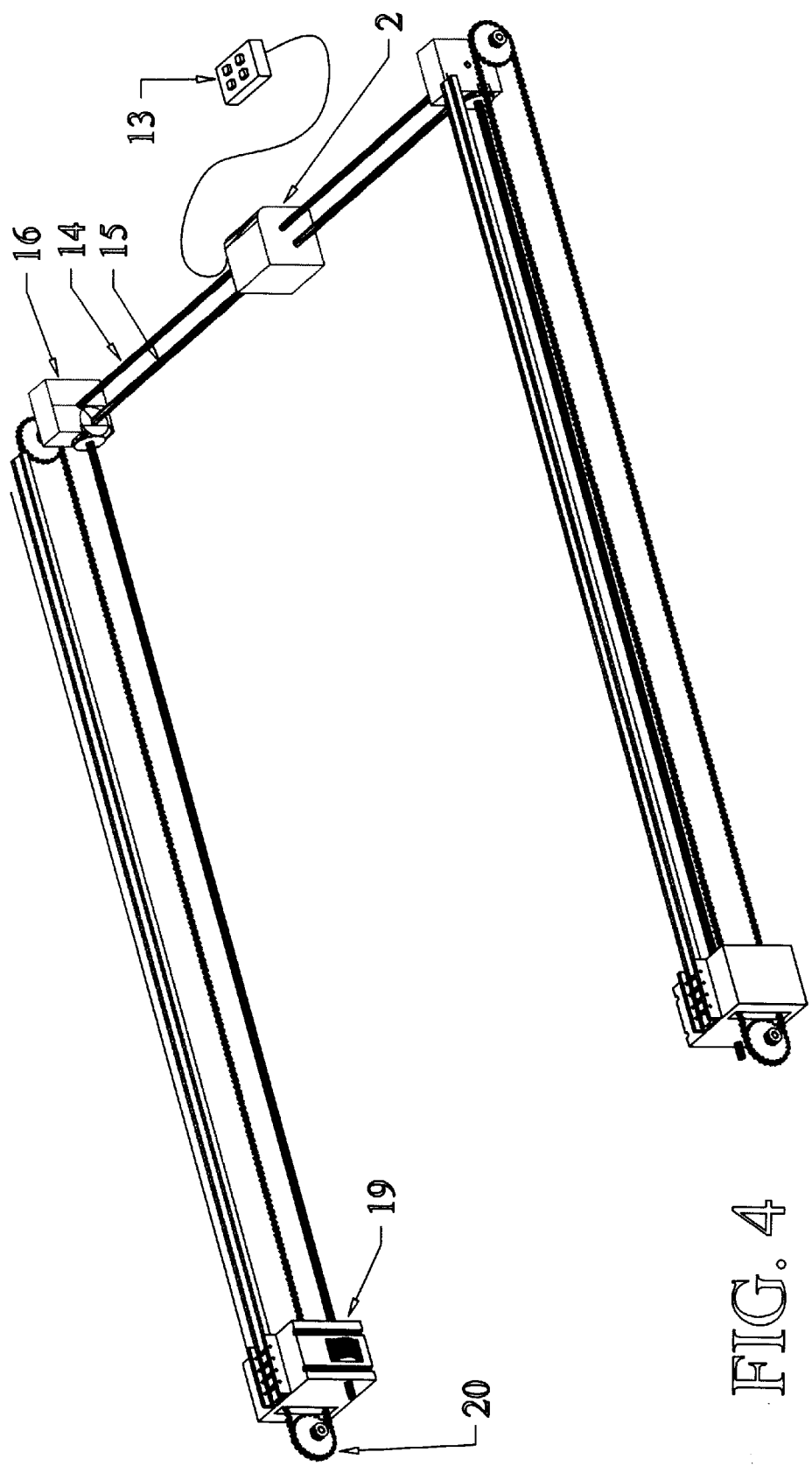
FIG. 4 is a standard pictorial representation of the preferred embodiment with some of the housing removed to illustrate the drive train.
Figure 5:
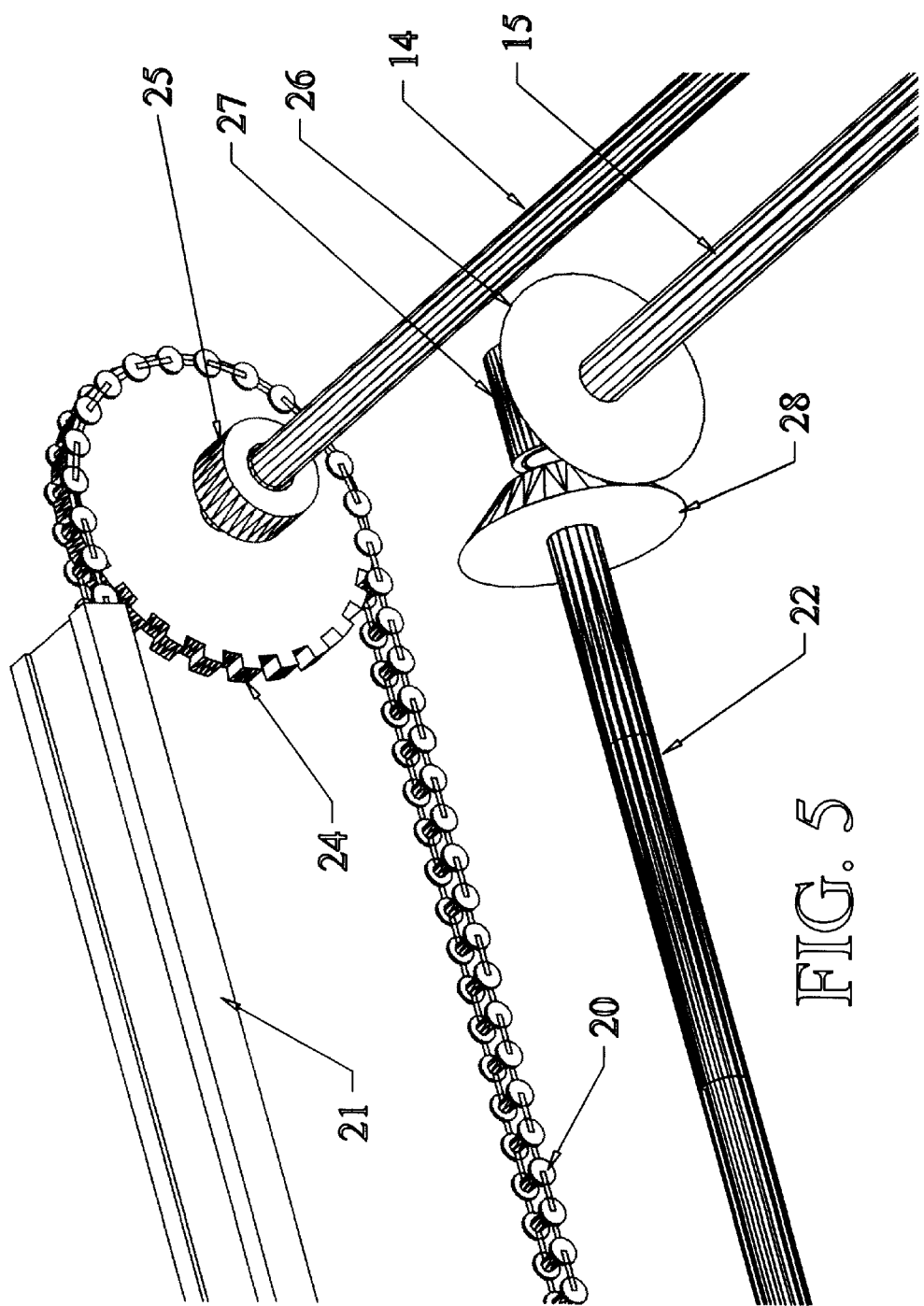
FIG. 5 is an enlarged pictorial representation of the chain drive and keyseat drive connections.
Figure 17:
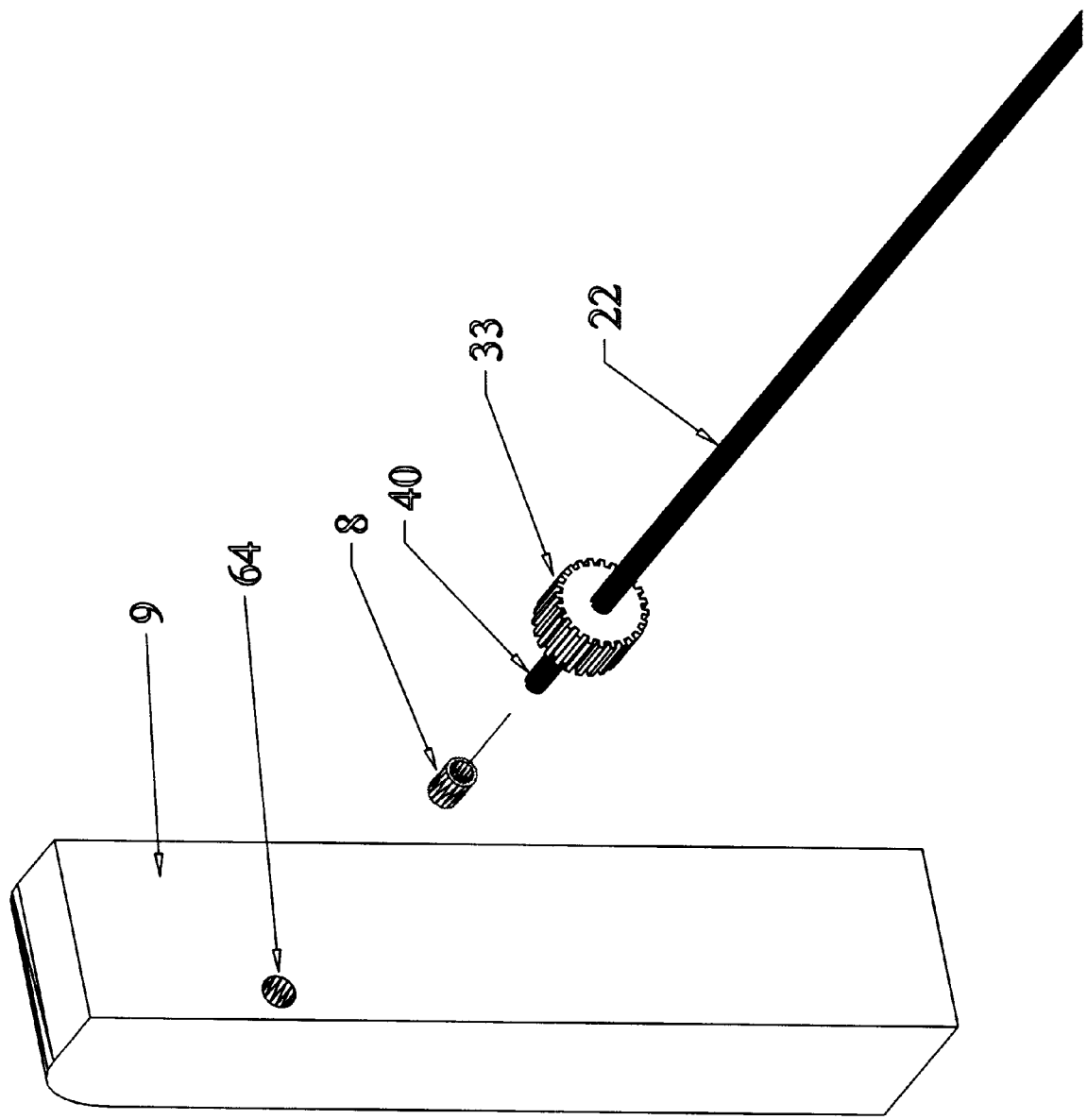
FIG. 17 is an exploded pictorial representation of the side support for the keyseat shaft and the spur gear.

As shown in FIG. 4, a push-button device 13 controls, an electric motor 2, housed in the front wall of the truck bed, that drives a gear rod 15 and a sprocket rod 14. Both of the said drive rods are supported in the front posts 16 of the truck bed sidewalls and are supported by roller bearings 25 (FIG. 5) to provide ease of rotation. The sprocket wheel 24 is attached by a fixed connection, to said sprocket rod 14 and the rotary motion of said sprocket rod 14 is transferred to a chain drive 20 (FIGS. 5 & 6) by said sprocket wheel 24. The bevel gear 26 is fixed to the said gear rod 15 and transfers motion to the second bevel gear 28 which engages with the keyseat shaft 22, having a key slot 41. The said keyseat shaft 22 has a scored surface and connects to front and rear truck posts by rotary bearings 27, 8, respectively. The end 40 of keyseat shaft 22 is placed into a bearing 8 in a hole 64 of post 9, as shown in FIG. 17. Said chain drive 20 connects with a second sprocket wheel 24 (See FIG. 6) which is fixed to an axle rod 35 that rotates in the rotary bearings 34 housed in the tail posts of the truck bed. An H-shaped track 21 (FIGS. 5 & 6) extends from and is attached to the front and tail posts of the truck bed. The said keyseat shaft passes through a drilled hole 31 (FIG. 15) in the carriage 19, and the chain drive loops through a slot 39 in the said carriage. The two loose ends of the said chain drive are affixed to the said carriage 19 thereby creating horizontal, back and forth, travel of the carriage along a track 21 in a direction parallel to the truck sidewalls. As the said carriage travels in said motion, it also slides along the keyseat shaft 22 through the said drilled hole 31.

Figure 15:
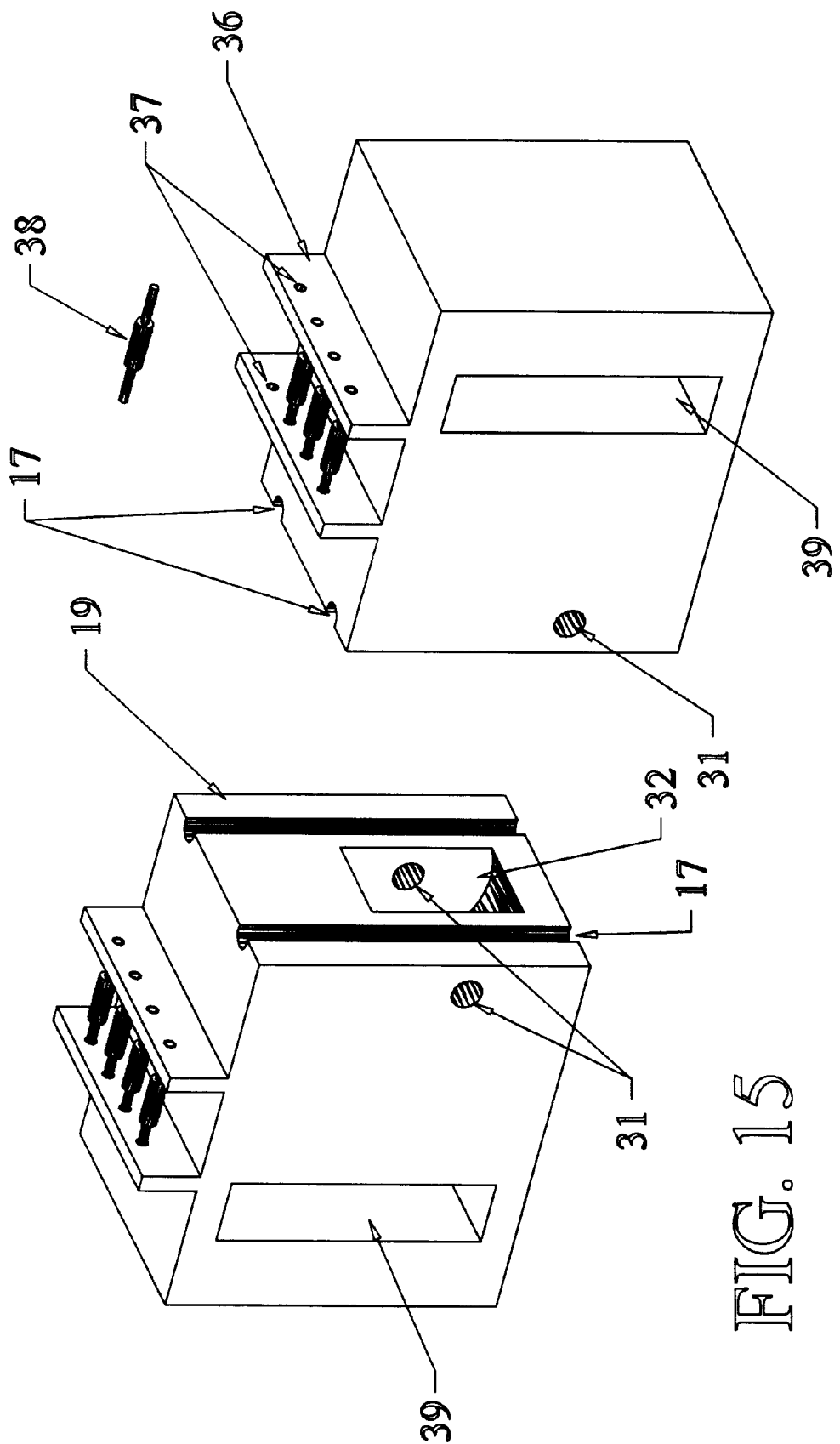
FIG. 15 is an enlarged pictorial representation showing two views of the carriage.
Figure 16:
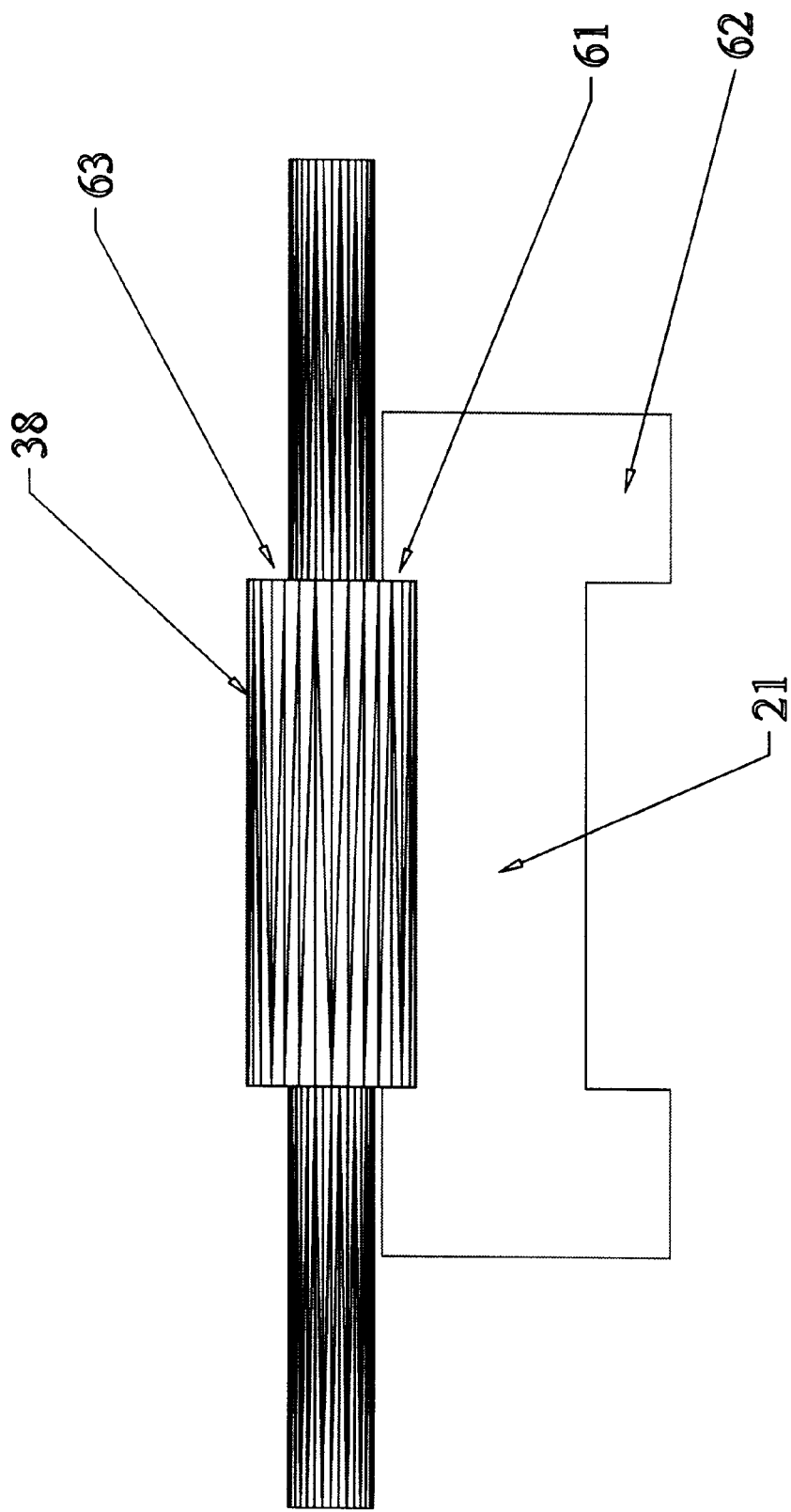
FIG. 16 is an enlarged orthographic view of the rollers and rail support for the carriage.

The said carriage 19 also consists of two wings 36 (FIG. 6) that contain a multiplicity of holes 37 that accommodate roller bearings and rollers 38., the latter having a shape 63 that engages identical portion 61 of track 21 having a solid body portion 62. As illustrated in FIGS. 15 and 16, said rollers support the carriage and travel along the said H-shaped track as the chain drive propels the carriage along, back and forth, from front to back of the truck bed. Said carriage is dually supported by the said H-shaped track rollers and by the said keyseat shaft 22. The said carriage also contains two vertical, cylindrical slots 17 that are designed to provide a track recess for the tracks 23 (FIG. 7) situated on the gear rack 5.

Figure 19:
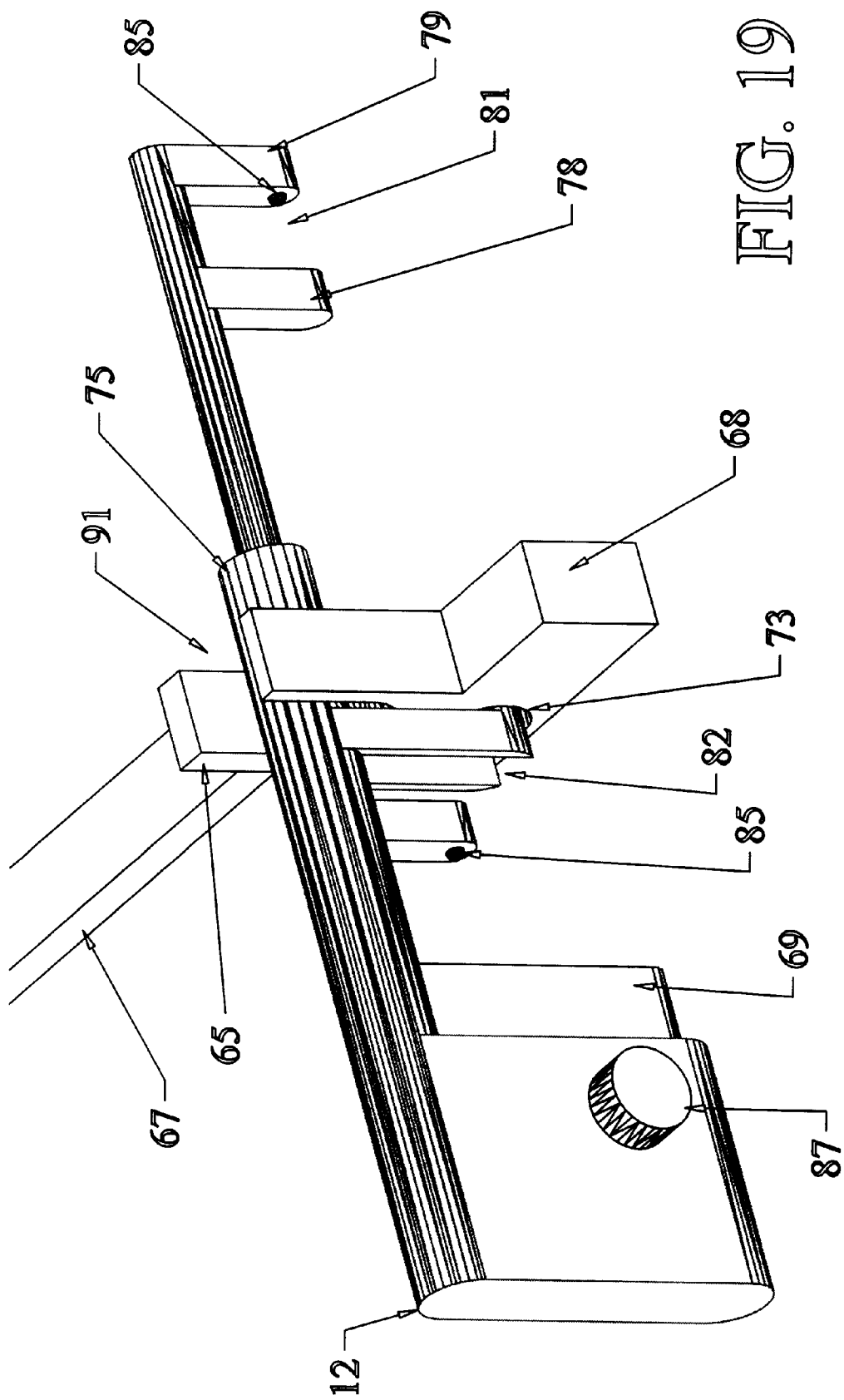
FIG. 19 is an enlarged, pictorial view of the locking handle assembly.
Figure 20:
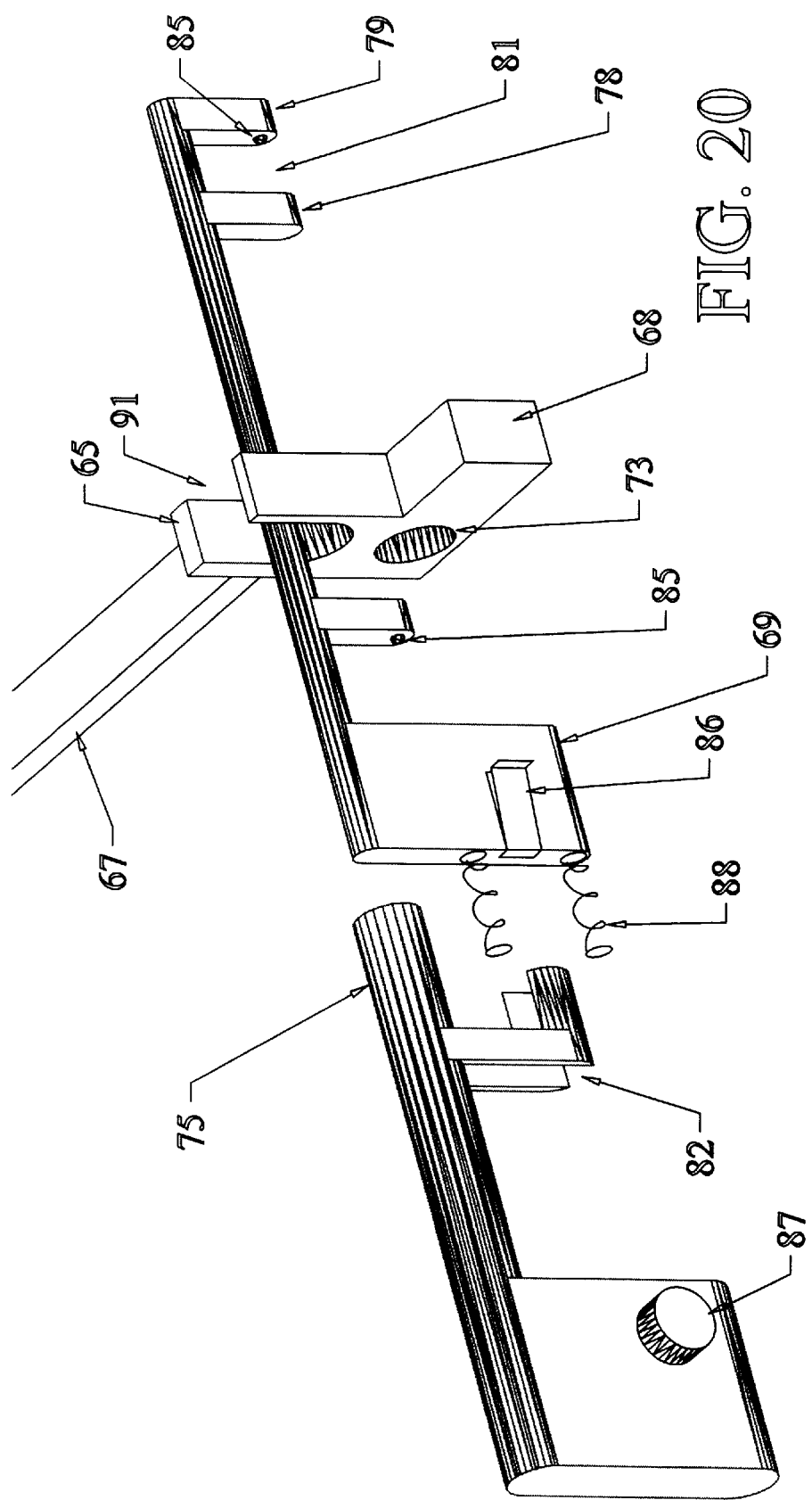
FIG. 20 is an enlarged, exploded pictorial of the locking handle assembly.
Figure 21:
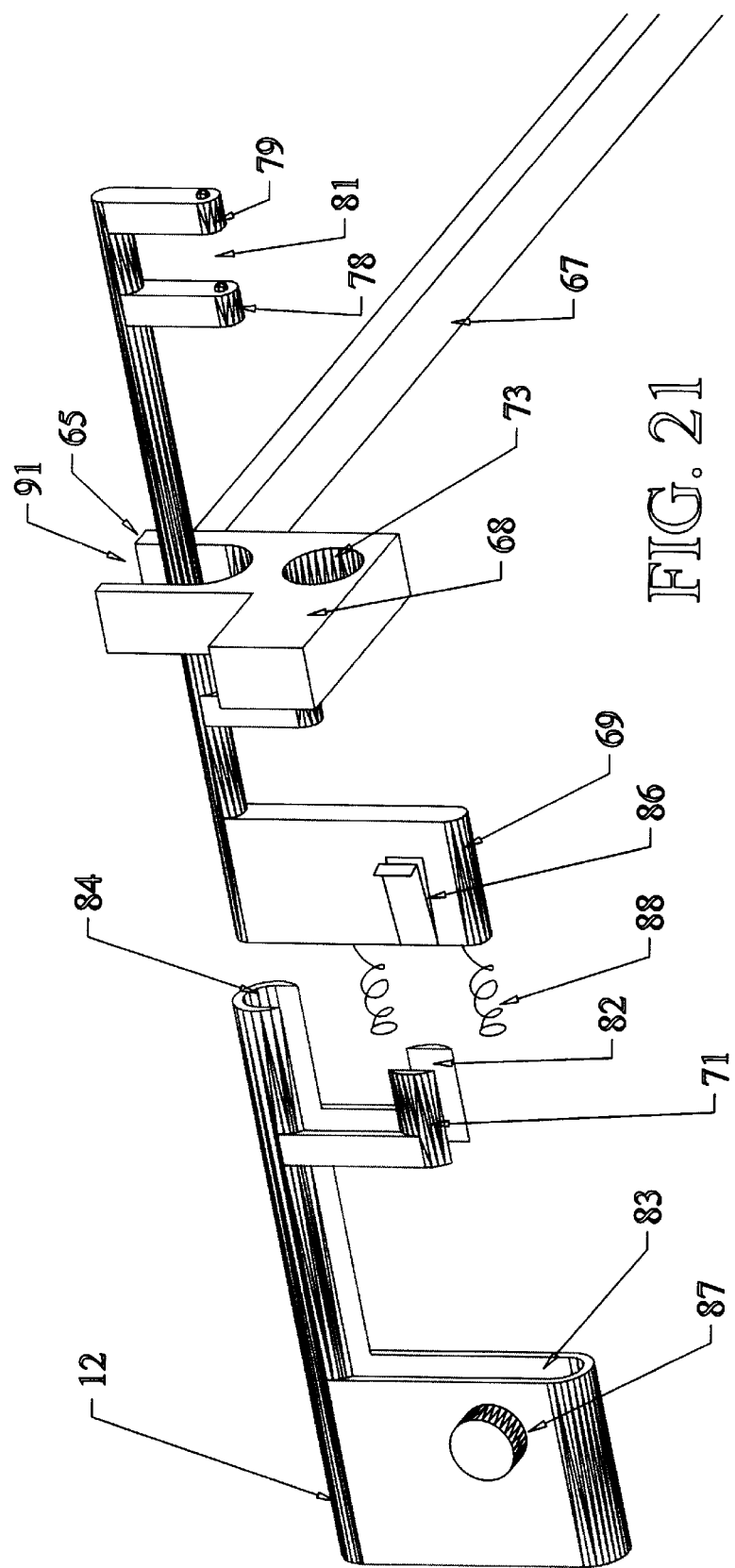
FIG. 21 is an enlarged, exploded pictorial of the locking handle assembly looking from underneath.
Figure 22:
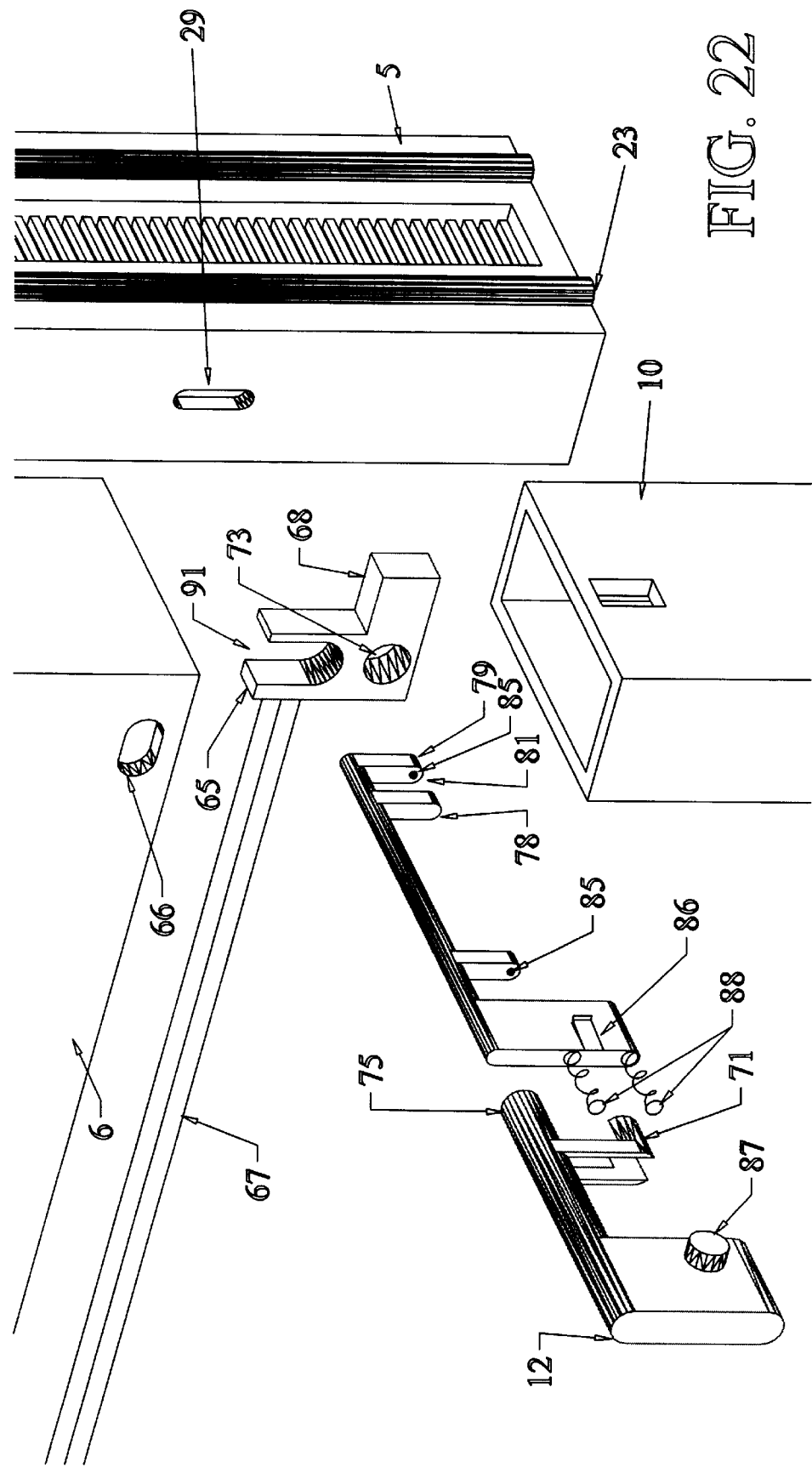
FIG. 22 is an exploded pictorial of the locking handle with adjacent components.
Figure 23:
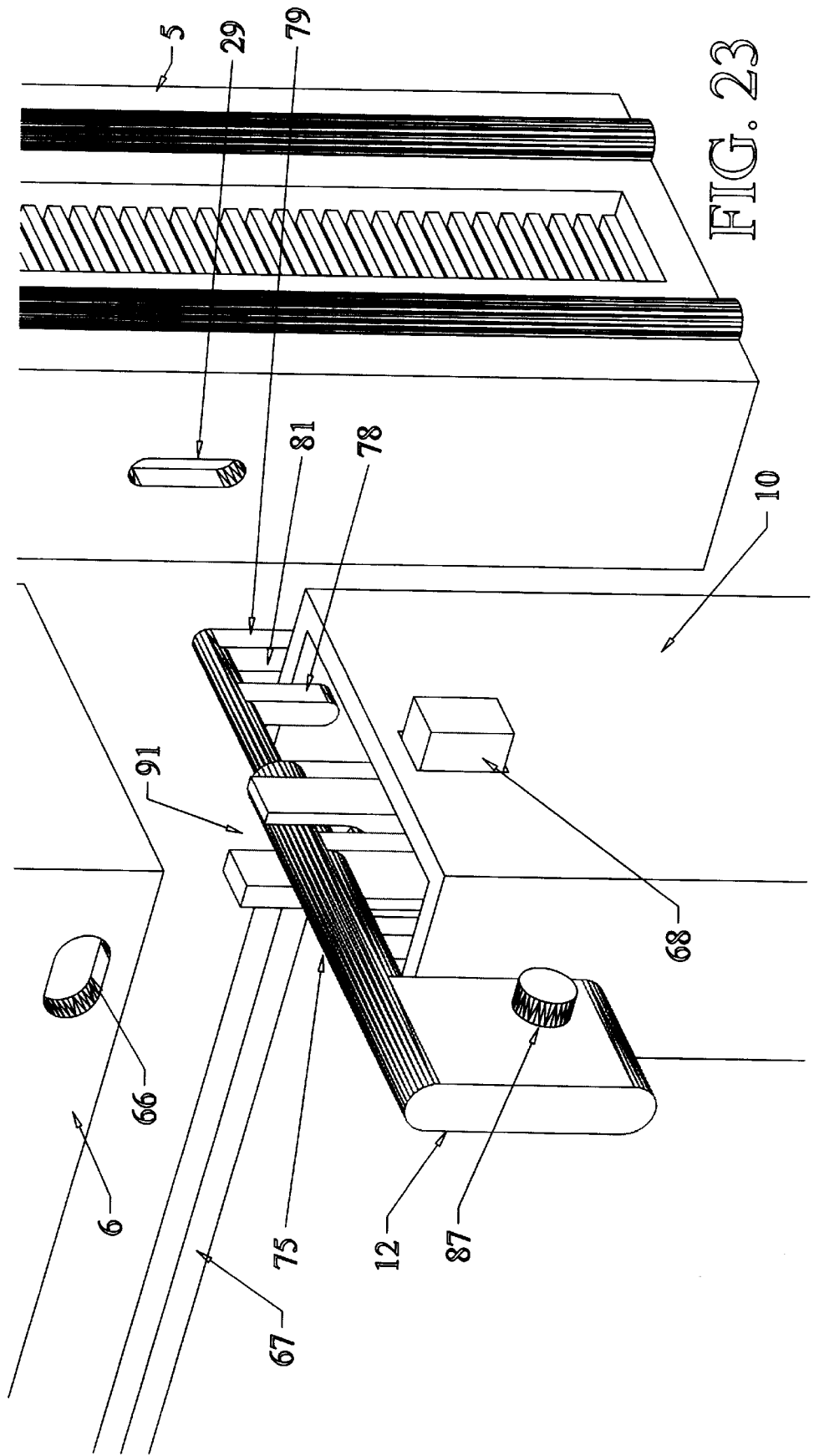
FIG. 23 is a partially exploded pictorial of the locking handle with adjacent components.
Figure 24:
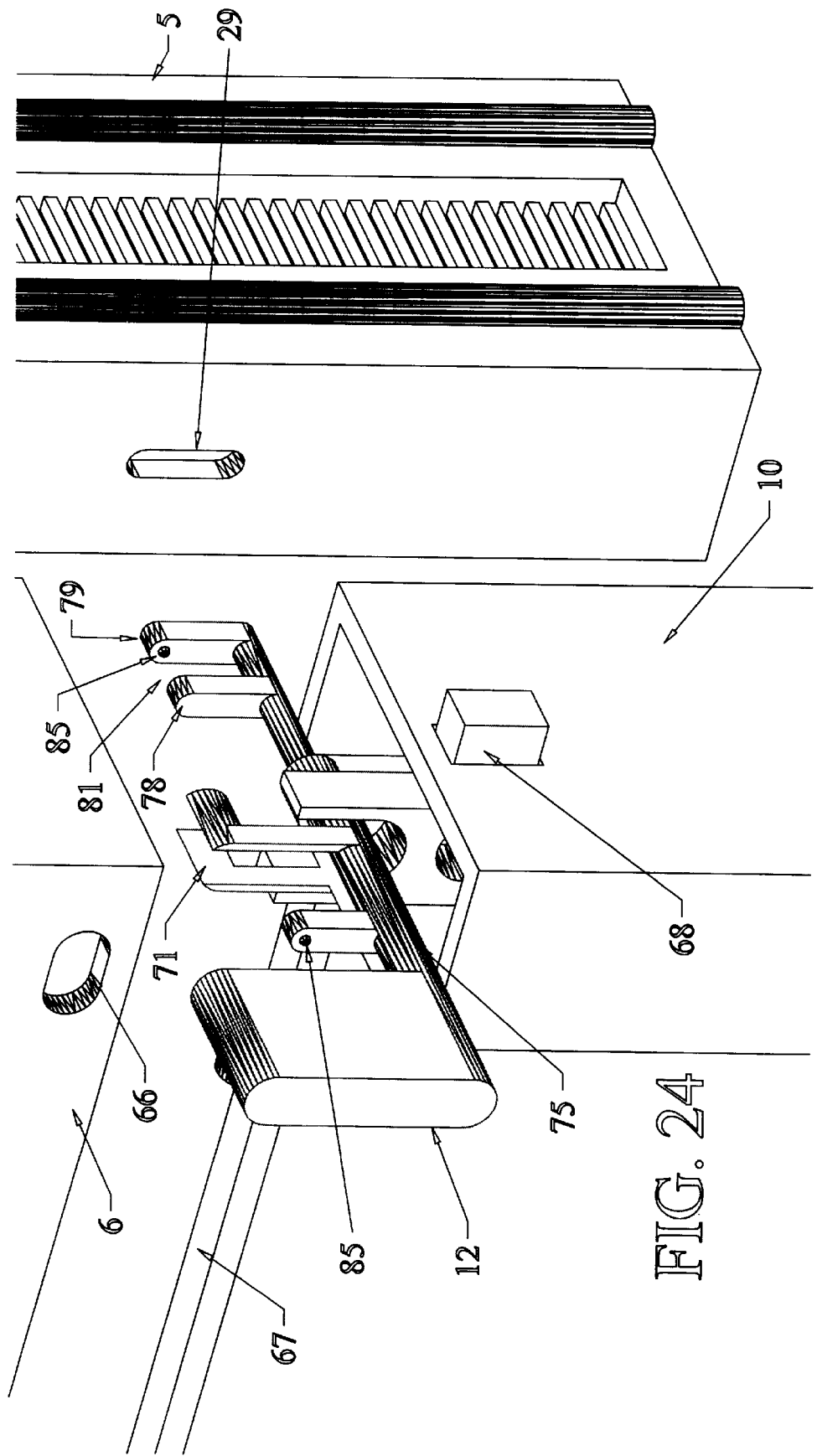
FIG. 24 is a partially exploded pictorial of the locking handle with adjacent components with the locking handle rotated 180 degrees.

A semi-circular core 32 (FIG. 15) provides cavity access in the said carriage 19 for the spur gear 33 (FIG. 8) that slides along the said keyseat shaft 22. The said spur gear is drilled 43 and keyed 42 so that the rotational motion in the said keyseat shaft 22 with slot 41 will be transferred to the said spur gear 33. The gear teeth 44 on the said spur gear mesh with the gear teeth 45 on the gear rack 5 thereby causing the rack to move up or down and slide along the said tracks 23 and track recesses 17 according to the direction that the said spur gear is turning. The said rack, being hollow, has a vertical slot 29 which has been provided so that the protrusion 79 (FIGS. 19 & 22) may be inserted into said opening for locking purposes. When the protrusion is pointing down (as shown in FIG. 19) the shape and the slot agree, and the said protrusion can pass unimpeded into the slot opening. The said hollow top rail 6 also has a vertical slot to match the one on the said hollow rack, so that when those two pieces are aligned, the protrusion 79 may pass through both pieces unimpeded. When the said protrusion is pointing upward (as shown in FIG. 24) the said protrusion locks behind the said rack wall within the hollow interior, and the said gear rack is then attached to the hollow top rail 6 (FIG. 9). The space 81 (FIG. 19) between protrusion 78 and protrusion 79 accommodates the two wall thicknesses of the hollow gear rack and the hollow top rail. Spring-loaded roller bearings 85 imbedded in both protrusion 79 (FIG. 20) and protrusion 78 (FIG. 21) along with corresponding semi-spherical indentions on the interior walls of said gear rack and said hollow top rail permit the two pieces to be locked together when the said locking handle 12 is turned to an up position. Likewise, the said spring-loaded bearings lock the said hollow top rail 6 to the U-shaped piece 10 when protrusion 78 and protrusion 85 are in a down position.

Figure 12:
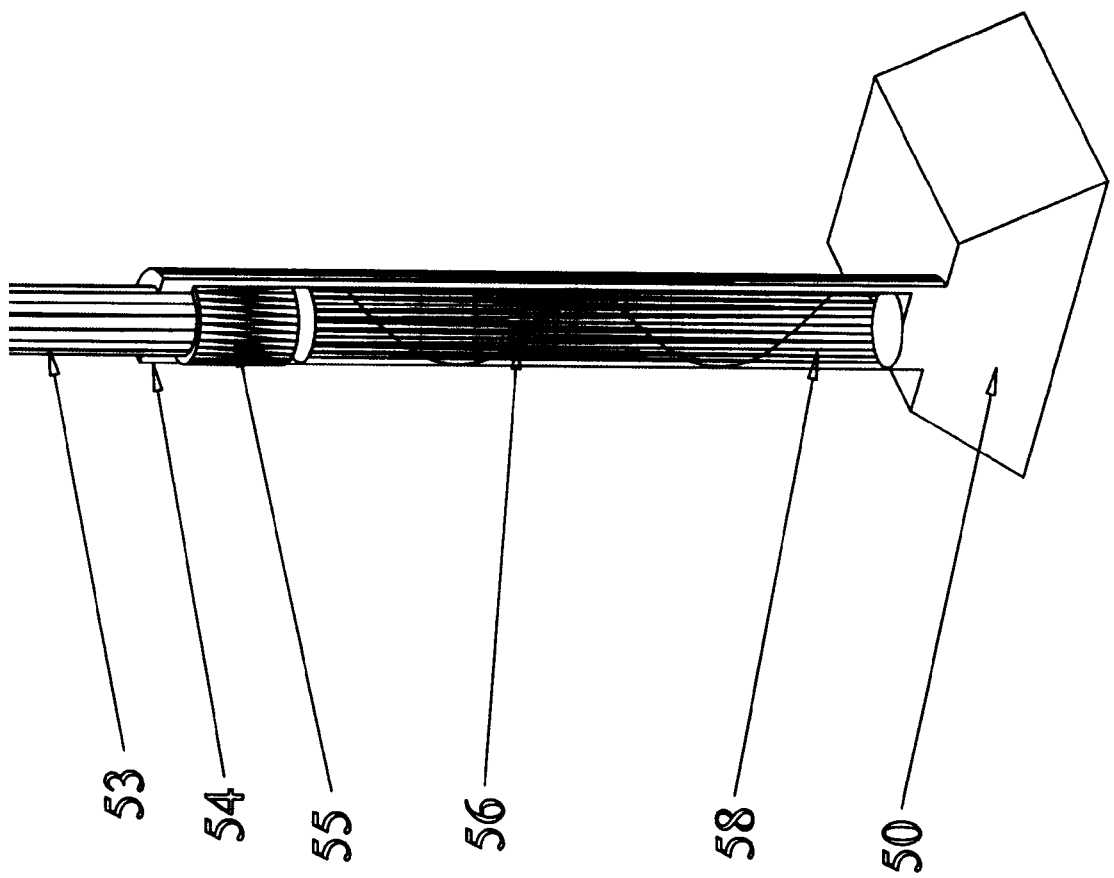
FIG. 12 is an enlarged sectional view of the telescoping leg with spring and spread pad.
Figure 13:
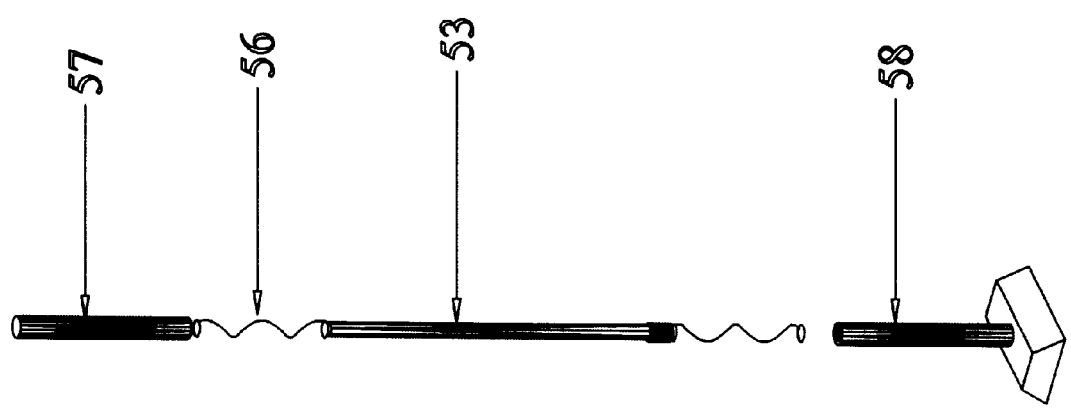
FIG. 13 is an exploded pictorial representation of the telescoping leg with springs and spread pad.

The said hollow top rail 6 has attached to it a plurality of equally spaced, spring-loaded fingers 11 (FIG. 9) which serve the function of applying pressure to rigid, long cargo loads which may be of unequal and varying heights within the limits of the compressibility of said fingers. The said fingers (See FIGS. 11 & 13) may be divided into a multiplicity of interlocking sections (in this instance there are three), and the sections are alternately solid and hollow. The solid finger rod 53 is compressed into the hollow finger cylinder 57 and the hollow finger cylinder 58, with the total height compressibility being roughly equal to height of the said finger rod. The said hollow finger cylinder has an interior lip 54 (FIG. 12), and the solid finger rod has an exterior lip 55, both lips of which are interlocking and prevent the entire finger assembly from sliding apart. All of the connections are assembled together by threaded connections. The bottom section of the finger assembly contains a permanently attached spread pressure seat pad 50 designed for holding down the cargo loads. The base of said pad has a width, depth and spacing that is comparable to that of the typical corrugated bed of the conventional pickup truck. The said hollow finger cylinder contains a pressure spring 56 which is designed to resist a predetermined load. When the said keyseat shaft turns the said spur gear and creates downward movement of the said gear rack, the said hollow top rail also moves downward creating pressure from the held cargo load onto the said pressure pad of the finger assembly thereby causing the said solid finger rod to be compressed into the said hollow finger cylinder. Because of the spring-loaded hollow finger sections, the finger assembly is then able to adjust to the variability of the cargo load heights.

Figure 10:
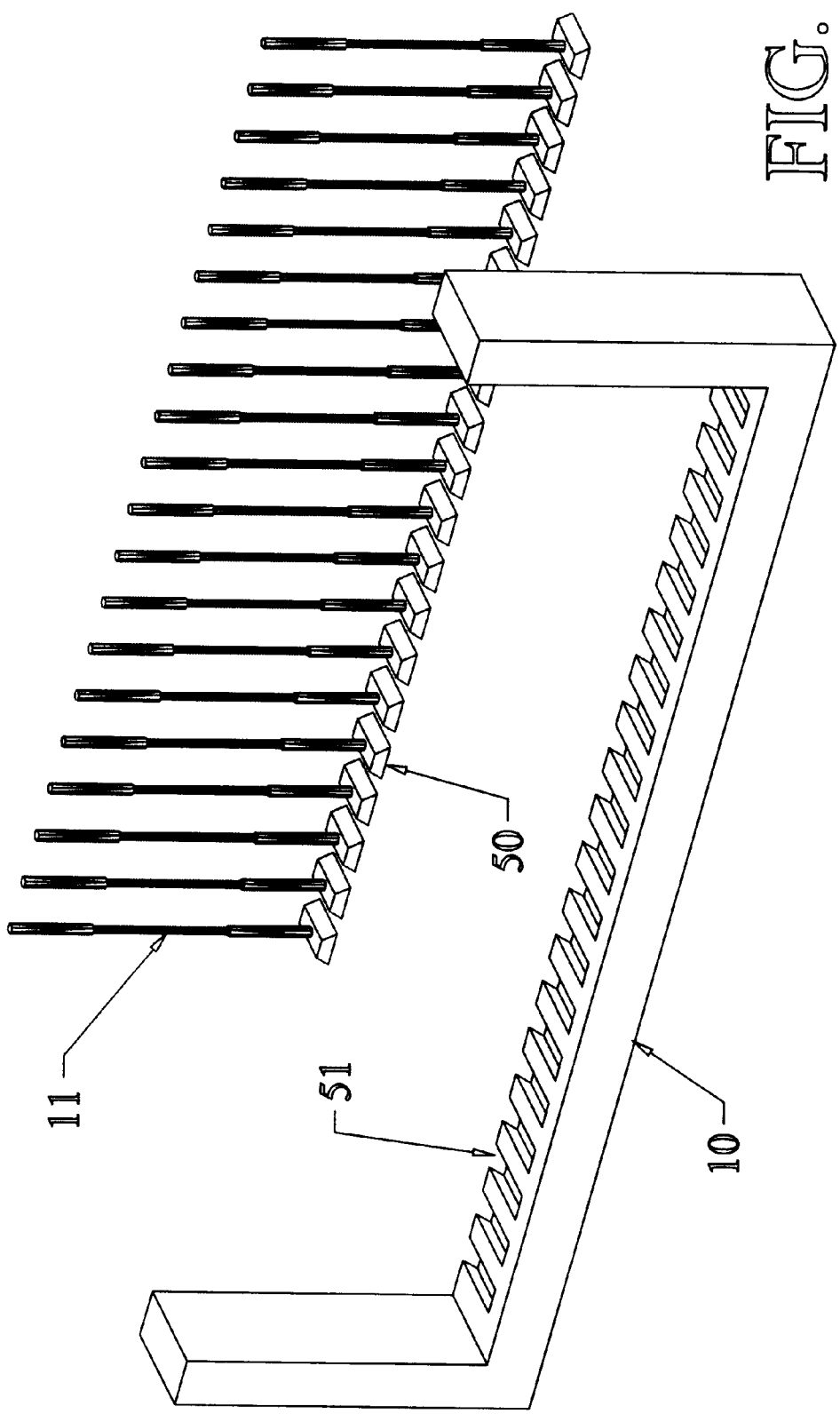
FIG. 10 is an exploded pictorial of the U-Shaped component and the multiplicity of legs.

The said U-shaped piece 10 (FIGS. 10 & 11) is attached to the rear posts of the truck bed in exactly the same manner as a conventional tailgate would be attached and is hinged in exactly the same manner thereby permitting the tailgate assembly to be dropped in the conventional manner. The base of the said U-shaped piece contains a plurality of slots 51 that conform in width, depth, and shape to the said pressure pad of the finger assembly. The said slots do not pass completely through the base, and when fitted into place, they therefore provide the rigidity that the entire tailgate assembly needs in order to be opened in the conventional manner.

Figure 18:
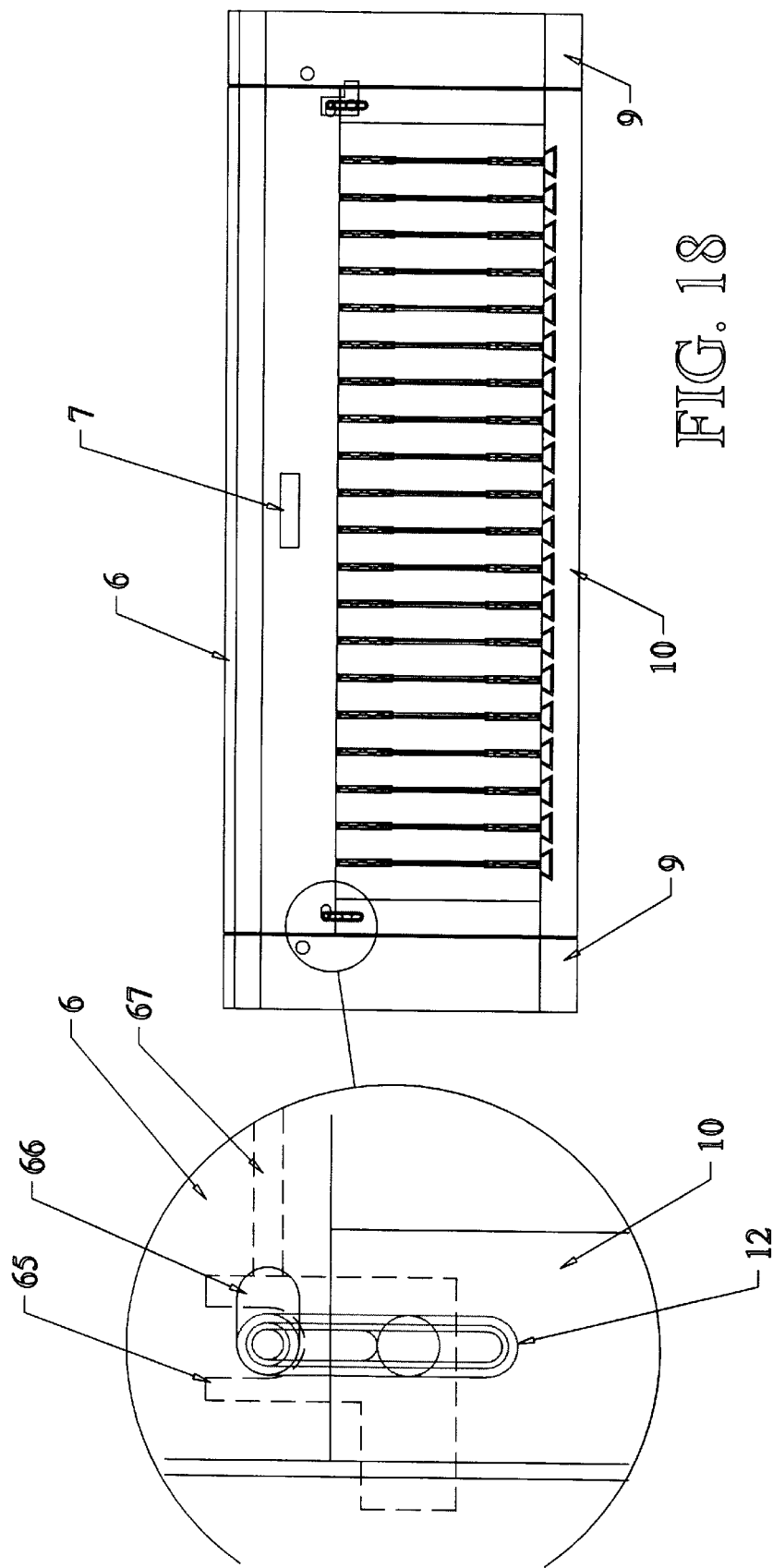
FIG. 18 is a rear elevation of the tailgate without the plurality legs with an enlarged detail elevation of the locking handle.

The said hollow top rail 6 contains a conventional truck tailgate-opening handle 7 (FIG. 18), and this connects with a locking bar 67 which is attached to an L-shaped piece 65 (FIGS. 18 & 19). When the handle is raised, the said locking bar is shifted toward the said handle thereby also shifting the attached said L-shaped piece and locking handle assembly 12. This movement is possible because of the slot 66 in the said hollow top rail through which the said locking handle assembly is connected. In the released position, the lower leg 68 of the L-shaped piece extends into a slotted opening in the rear post 9, but when the said tailgate-opening handle is raised, the shifting movement of the said locking bar pulls the lower leg 68 clear of the said rear post and permits the tailgate to be opened.

The said locking handle assembly (FIGS. 19, 20, & 21) contains an outer-nesting hollow piece 12 and an inner-nesting solid piece 69. The said outer-nested piece 12 has a hollow handle 83 to accommodate the thickness of the inner-nested solid handle. The cylindrical barrel 75 of the said outer-nested piece also has an attached L-shaped bar and rod 71 and all three segments are split 82 and bored 84 to accommodate the nesting of the said inner-nested piece. The said outer-nested piece has a spring-loaded push button 87 and inner lip for releasing the spring latch 86 on the said inner-nested piece when the two pieces are engaged. The compression springs 88 automatically retract the said outer-nested piece when the said push button is pushed thereby causing the said split rod section to disengage from the hole 73 in the L-shaped piece. When the said split rod is engaged in the said hole 73 (FIG. 19) the previously described unlatching of the tailgate by the pull of the said latch bar can take place. The said L-shaped piece is slotted on top 91 so that the when the moveable tailgate assembly is raised, the said locking handle assembly will travel with the moveable tailgate assembly while the said L-shaped piece remains with the said U-shaped piece as the top of the said U-shaped piece is hollow.

The preceding descriptions and drawings of the preferred embodiment with variations of the invention have shown, described and pointed out all to the fundamental features of the invention. While it will be understood that deletions of details, substitutions or changes of form or detail, as well as modifications of the described uses of this apparatus as outlined here can be made by someone familiar with the art, any such nuances or variations should not diminish the claims to the scope of this invention. It is therefore understood that this invention is not confined to this particular mode of construction or arrangements of parts thereof, but it encompasses all such modified forms thereof that come within the scope and spirit of the following claims.

What is claimed is:

1. A moveable tailgate assembly on a pickup truck having vertically raised side and forward panels surrounding a truck bed comprising:
    a motor apparatus;
    a drive means mounted to said side panels and operated by said motor apparatus;
    a tailgate mounting means affixed to and movable along the truck bed by the drive means; and
    a tailgate assembly attached to said tail gate mounting means and moveable with said mounting means, and being operative to be opened and closed about a horizontal axis.

2. The movable tailgate assembly of claim 1 wherein the drive means comprises an electric motor and a motor control.

3. The moveable tailgate assembly of claim 1 further comprising:
    an H-rail affixed to each of the sidewalls, and
    wherein the drive means comprises a chain drive system and a carriage that is propelled by the chain drive system for transport along the H-rails.

4. The moveable tailgate assembly of claim 1, further comprising vertically arranged posts disposed at the rear of the truck bed;
- a vertically disposed gear rack supported by each of said posts;
- a respective spur gear mounted to said tailgate assembly for engaging with each of said gear racks; and
- a mechanism, engaged with said drive means, for providing controllable vertical movement to said tailgate assembly.

5. The moveable tail gate assembly of claim 1 wherein the tail gate assembly comprises:
- a tailgate hinged for opening and closing about said horizontal axis;
- a horizontal hinging mechanism defining the horizontal axis; and
- a U-shaped, slotted base support for the horizontal hinging mechanism, the base support being attached to the tailgate mounting means.

6. The moveable tail gate assembly of claim 1 wherein the tail gate assembly comprises:
- a U-shaped base support, having a horizontal base and two vertically extending pieces, and a top rail,
- a plurality of spring loaded fingers affixed to the top rail and vertically extending to the horizontal base.

7. The moveable tail gate assembly of claim 6 wherein the horizontal base comprises a plurality of slots and at least a plurality of the spring loaded fingers further comprise pressure pads that engage with the slots.

8. The moveable tail gate assembly of claim 7 wherein the pressure pads removeably fit into the slots in said base support.

9. The moveable tail gate assembly of claim 5 further comprising a locking mechanism for securing the tailgate against movement about the horizontal axis by the hinging mechanism.

* * * * *